United States Patent
Hong et al.

(10) Patent No.: US 9,977,582 B2
(45) Date of Patent: May 22, 2018

(54) WINDOW DISPLAY METHOD AND APPARATUS OF DISPLAYING A WINDOW USING AN EXTERNAL INPUT DEVICE

(71) Applicant: Samsung Electronics Co., Ltd., Gyeonggi-do (KR)

(72) Inventors: Jihun Hong, Seoul (KR); Sunhee Kim, Gyeonggi-do (KR); Kwanghyun Kim, Incheon (KR); Yonghoon Jin, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 243 days.

(21) Appl. No.: 14/582,649

(22) Filed: Dec. 24, 2014

(65) Prior Publication Data
US 2015/0193134 A1    Jul. 9, 2015

(30) Foreign Application Priority Data

Jan. 3, 2014    (KR) ..................... 10-2014-0000518

(51) Int. Cl.
G06F 3/0484    (2013.01)
G06F 3/0481    (2013.01)
G06F 3/0488    (2013.01)

(52) U.S. Cl.
CPC ........ G06F 3/04847 (2013.01); G06F 3/0481 (2013.01); G06F 3/0488 (2013.01); G06F 3/04883 (2013.01)

(58) Field of Classification Search
CPC .. G06F 3/0481; G06F 3/04817; G06F 3/0482; G06F 3/0488
See application file for complete search history.

(56) References Cited

U.S. PATENT DOCUMENTS

2003/0107604 A1*    6/2003  Ording ................. G06F 3/0481
                                                                715/788
2005/0177857 A1    8/2005  Park et al.
(Continued)

FOREIGN PATENT DOCUMENTS

EP    2 657 829 A2    10/2013
JP    2000-187546 A    7/2000
(Continued)

OTHER PUBLICATIONS

OpenOffice, "Lines, arrows, and rectangles", last modified: Jul. 16, 2008, https://wiki.openoffice.org/wiki/Documentation/OOoAuthors_User_Manual/Draw_Guide/Lines_and_arrows.*

(Continued)

*Primary Examiner* — Andrey Belousov
*Assistant Examiner* — Seth A Silverman
(74) *Attorney, Agent, or Firm* — Cha & Reiter, LLC

(57) ABSTRACT

A window display method and apparatus of an electronic device is provided for displaying windows according to a signal input from an external input device. When a predetermined input of a function key is received for generating a new window within a display screen from the external input device, during a window generation mode, generating and displaying the new window including at least one of menu items, icons, and files that are preselected when such a request for generating a window is received from the external input device.

16 Claims, 15 Drawing Sheets

(56) References Cited

U.S. PATENT DOCUMENTS

| | | | |
|---|---|---|---|
| 2007/0180400 A1* | 8/2007 | Zotov | G06F 3/0481 |
| | | | 715/788 |
| 2008/0168403 A1 | 7/2008 | Westerman et al. | |
| 2011/0119624 A1 | 5/2011 | Coldefy et al. | |
| 2012/0293558 A1 | 11/2012 | Dilts | |
| 2013/0174179 A1 | 7/2013 | Park et al. | |
| 2013/0205304 A1 | 8/2013 | Jeon et al. | |
| 2013/0283206 A1 | 10/2013 | Kim et al. | |
| 2014/0164963 A1* | 6/2014 | Klemenz | G06F 3/04886 |
| | | | 715/765 |

FOREIGN PATENT DOCUMENTS

| | | |
|---|---|---|
| KR | 10-2002-0001212 A | 1/2002 |
| KR | 10-0584396 B1 | 5/2006 |
| KR | 10-2013-0076397 A | 7/2013 |
| KR | 10-2013-0081112 A | 7/2013 |
| KR | 10-2013-0090060 A | 8/2013 |
| KR | 10-2013-0098754 A | 9/2013 |
| KR | 10-2013-0111077 A | 10/2013 |
| KR | 10-2013-0116882 A | 10/2013 |

OTHER PUBLICATIONS

Review: Resize Sense—A Powerfully Simple Batch Image Editor for Mac, Jul. 23, 2013, pp. 1-6, XP055185119 http://www.mactrast.com/2013/01/review-resize-sense-for-ios/.

\* cited by examiner

WINDOW DISPLAY METHOD AND APPARATUS OF DISPLAYING A WINDOW USING AN EXTERNAL INPUT DEVICE

CLAIM OF PRIORITY

This application claims the benefit under 35 U.S.C. § 119(a) of a Korean patent application filed on Jan. 3, 2014 in the Korean Intellectual Property Office and assigned Serial No. 10-2014-0000518, the entire disclosure of which is hereby incorporated by reference.

TECHNICAL FIELD

The present disclosure relates to a window display method and apparatus of an electronic device for displaying windows according to a signal input from an external input device.

BACKGROUND

With the advance of electronic technology, various types of mobile computing electronic devices are available which includes as a smartphone, a laptop computer, and a tablet computer. These mobile computing devices are provided with various types of input devices such as a touchpad, an electronic pen, and cordless mouse for user convenience.

The above type electronic devices are also equipped with a large display unit to secure graphical legibility. Additionally, to enhance user's experience and convenience, an intuitive windowing system for presenting the icons as intuitive representations of software tools and files is becoming an important factor.

Accordingly, there is a need for an improved method of entering the window function easily in the electronic device equipped with the display and input devices for user convenience, especially in multi-window multitasking operations using a smart phone or tablet that is equipped with relatively a small screen.

SUMMARY

The present disclosure provides a window display method and apparatus of an electronic device that is paired with an external input device and capable of facilitating the multitasking operations.

Also, the present disclosure provides a window display method and apparatus of an electronic device that is paired with an external input device and capable of displaying multiple windows efficiently.

Also, the present disclosure provides a window display method and apparatus of an electronic device that is paired with an external input device and capable of switching between windows and home screen.

In accordance with an aspect of the present disclosure, a window display method of an electronic device paired with an external input device is provided. The method includes detecting a request signal from the external input device and in response, notifying an entry of a window generation mode; receiving an input gesture defining a boundary or a portion of the boundary corresponding to a window on a display screen using the external input device and in response, displaying the window including at least one of menu items, icons, and files on the display screen; and terminating notification of the entry to the window generation mode in response to a termination request signal from the external input device.

In accordance with another aspect of the present disclosure, a window display apparatus of an electronic device is provided. The window display apparatus includes a display; an input/output interface through which a user input signal is received from an external input device; at least one processor configured to: notify an entry of a window generation mode in response to a request received from the external input device; receive an input gesture defining a boundary or a portion of boundary corresponding to a window on the display using the external input device; display the window including at least one of menu items, icons, and files on the display; and terminate notification of the entry to the window generation mode in response to a termination request signal received from the external input device.

DETAILED DESCRIPTION

Figure 1:
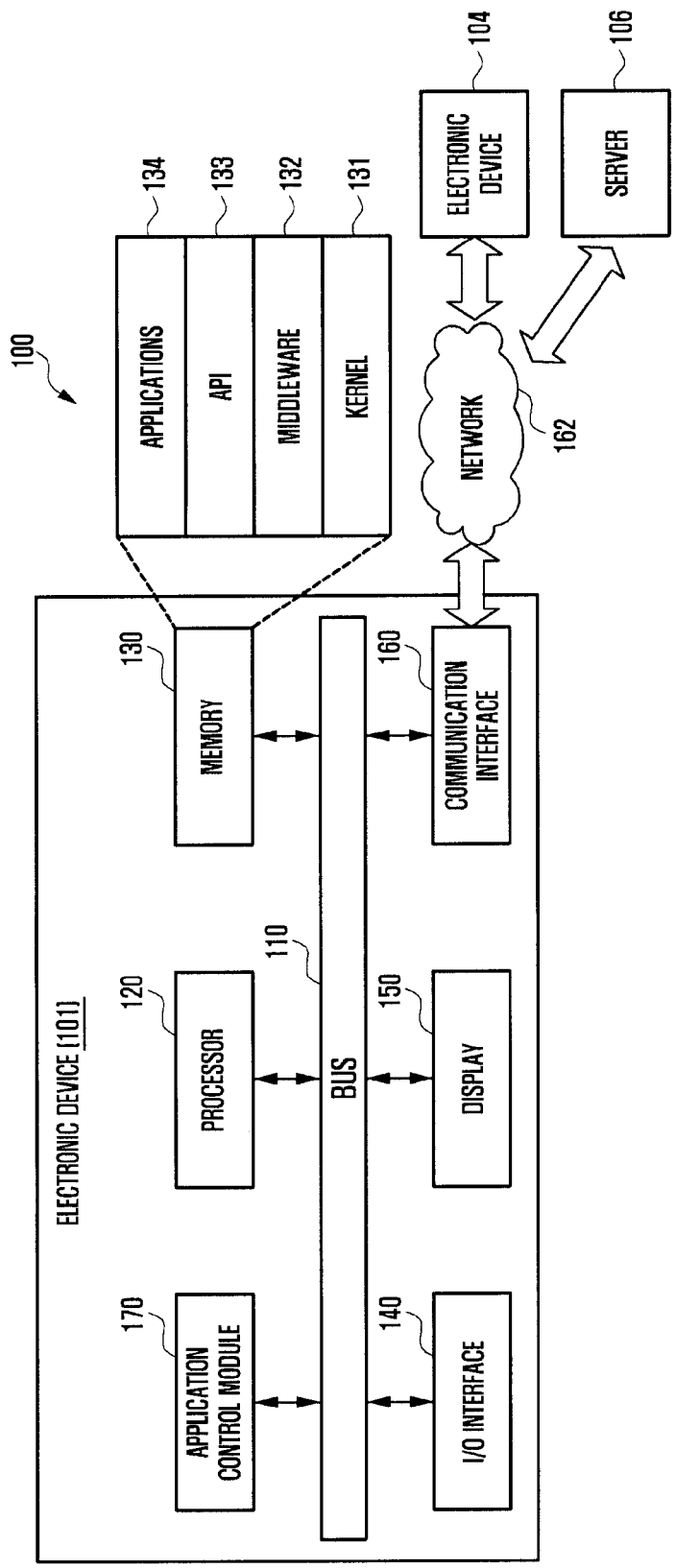
FIG. 1 is a diagram illustrating a network architecture including an electronic device according to various embodiments of the present disclosure.

Exemplary embodiments of the present disclosure are described with reference to the accompanying drawings in detail. Although the description is made with reference to particular embodiments, the present disclosure can be implemented with various modifications. Thus, it should be understood that there may be various equivalents and modified examples that can replace the embodiments described in the present specification and the configuration shown in the drawings. The same reference numbers are used throughout the drawings to refer to the same or like parts.

It will be understood that the expressions "comprises" and "may comprise" is used to specify presence of disclosed function, operation, component, etc. but do not preclude the presence of one or more functions, operations, components, etc. It will be further understood that the terms "comprises" and/or "has" when used in this specification, specify the presence of stated feature, number, step, operation, component, element, or a combination thereof but do not preclude the presence or addition of one or more other features, numbers, steps, operations, components, elements, or combinations thereof.

In the present disclosure, the expression "and/or" is taken as specific disclosure of each and any combination of enumerated things. For example, A and/or B is to be taken as specific disclosure of each of A, B, and A and B.

As used herein, terms such as "first," "second," etc. are used to describe various components, however, it is obvious that the components should not be defined by these terms. For example, the terms do not restrict the order and/or importance of the corresponding components. The terms are used only for distinguishing one component from another component. For example, a first component may be referred to as a second component and likewise, a second component may also be referred to as a first component, without departing from the teaching of the inventive concept.

It will be understood that when an element or layer is referred to as being "connected to" or "coupled to" another element or layer, it can be directly connected or coupled to the other element or layer or intervening elements or layers may be present. In contrast, when an element is referred to as being "directly on," "directly connected to" or "directly coupled to" another element or layer, there are no intervening elements or layers present.

The terminology used herein is for the purpose of describing particular embodiments only and is not intended to be limiting of the disclosure. As used herein, the singular forms "a", "an" and "the" are intended to include the plural forms as well, unless the context clearly indicates otherwise.

Unless otherwise defined herein, all terms including technical or scientific terms used herein have the same meanings as commonly understood by those skilled in the art to which the present disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

According to an embodiment of the present disclosure, an electronic device has a communication function. Examples of the electronic device include a smartphone, a table Personal Computer (PC), a mobile phone, a video phone, an electronic book (ebook) reader, a desktop PC, a laptop computer, a netbook computer, a Personal Digital Assistant (PDA), a Portable Multimedia Player (PMP), an MP3 player, a mobile medical appliance, a camera, a wearable device (e.g. electronic glasses and Head Mounted Device (HMD)), an electronic cloth, an electronic bracelet, an electronic necklace, an electronic appcessory, an electronic tattoo, and a smartwatch.

According to certain embodiments, an electronic device may be a smart home appliance equipped with a communication function. Examples of the smart home appliance include a Television (TV), a Digital Video Disk (DVD) player, an audio, a refrigerator, an air conditioner, a vacuum cleaner, an oven, a microwave oven, a laundry machine, an air cleaner, a set-top box, a TC box (e.g. Samsung Home-Sync™, apple TV™, and google TV™), a game console, an electronic dictionary, an electronic key, a camcorder, and an electronic frame.

According to certain embodiments, examples of an electronic device include a medical device (e.g. Magnetic Resonance Angiography (MRA), Magnetic Resonance Imaging (MRI), a Navigation device, a Global Positioning System (GPS) receiver, an Event Data Recorder (EDR), a Flight Data Recorder (FDR), a car infotainment device, electronic equipment for ship (e.g. maritime navigation device and gyro compass), aviation electronic device (avionics), security device, a vehicle head unit, an industrial or home robot, an Automatic Teller Machine (ATM) of a financial institution, and a Point Of Sales (POS).

According to certain embodiments, examples of an electronic device may include furniture or part of building/construction which has a communication function, an electronic board, an electronic signature receiving device, a projector, and a metering device (e.g. water, electricity, and electric wave metering devices). According to an embodiment, the electronic device may be one or any combination of the above enumerated devices. According to an embodiment, the electronic device may be a flexible device. However, it is obvious to those in the art that the electronic device of the present disclosure is not limited to the above devices.

A description is made of the electronic device according to various embodiments with reference to accompanying drawings hereinafter. In the description of the various embodiments, the term 'user' may denote a person or a device (e.g. intelligent electronic device) which uses the electronic device.

FIG. 1 is a diagram illustrating a network architecture including an electronic device whereto various embodiments of the present disclosure are applicable. Referring to FIG. 1, the electronic device 101 includes a bus 110, a processor 120, a memory 130, an input/output interface 140, a display 150, a communication interface 160, and an application control module 170.

The bus 110 may be a circuitry which connects the aforementioned components to each other to communicate signals (e.g. control messages) therebetween.

The processor 120 receives a command from any of the aforementioned components (e.g. memory 130, input/output interface 140, display 150, communication interface 160, and application control module) through the bus 110, interprets the command, and executes operation or data processing according to the decrypted command.

The memory 130 may store the command or data received from the processor 120 or other components (e.g. input/output interface 140, display 150, communication interface 160, application control module, etc.) or generated by the processor 120 or other components. The memory 130 may store program modules including kernel 131, middleware 132, Application Programming Interface (API) 133, applications 134, etc. Each programming module may be implemented as software, firmware, hardware, and any combination thereof. According to various embodiments of the present disclosure, the memory 130 may store the application programs for generating a window based on the information input through the external input device and controlling execution of specific function in the generated window. The window generation application may generate two or more windows and includes the control data for use in controlling size adjustment, creation, removal, and hiding of windows. According to a certain embodiment, the memory 130 may store the control data for control of generating a window, executing specific function in the window, adjusting size of the window, removing of the window, and hiding of the window in accordance with a hardware or software key input.

The kernel 131 may control or manage the system resources (e.g. bus 110, processor 120, and memory 130) for use in executing the operation or function implemented with the middleware 132, the API 133, or the application 134. The kernel 131 also may provide an interface allowing the middleware 132, API 133, or application 134 to access the components of the electronic device 101 to control or manage.

The middleware 132 may work as a relay of data communication between the API 133 or application 134 and the kernel 131. The middle 132 may execute control of the task requests (e.g. scheduling and load balancing requests) from the applications 134 in such a way of assigning priority for use of the system resource (e.g. bus 110, processor 120, and memory 130) of the electronic device to at least one of the applications 134.

The API 133 is the interface for the applications 134 to control the function provided by the kernel 131 or the middleware 132 and may include at least one interface or function (e.g. command) for file control, window control, image control, or text control.

According to various embodiments, the applications 134 may include Short Messaging Service/Multimedia Messaging Service (SMS/MMS) application, email application, calendar application, alarm application, health care application (e.g. application of measuring quantity of motion or blood sugar level), and environmental information application (e.g. atmospheric pressure, humidity, and temperature applications). Additionally or alternatively, the application 134 may be an application related to information exchange between the electronic device 101 and other external electronic device (e.g. electronic device 104). Examples of the information exchange application may include a notification relay application for relaying specific information to the external electronic device 104 and a device management application for managing the external electronic device.

For example, the notification relay application may be provided with a function of relaying the alarm information generated by the other applications (e.g. SMS/MMS application, email application, health care application, and environmental information application) of the electronic device to an external electronic device (e.g. electronic device 104). Additionally or alternatively, the notification relay application may provide the user with the notification information received from an external electronic device (e.g. electronic device 104). The electronic device application may manage (e.g. install, delete, and update) the function of an external electronic device (e.g. turn-on/off of the electronic device 104 itself (or a part of it) or adjustment of the brightness (or resolution) of the display) which communicates with the electronic device 101 or the service (e.g. communication or messaging service) provided by the external electronic device or an application running on the external device.

According to various embodiments, the applications 134 may include an application designated according to the property (e.g. type) of an external electronic device (electronic device 104). If the external electronic device is the MP3 player, the applications 134 may include a music playback application. Similarly, if the external electronic device is a mobile medical appliance, the applications 134 may include a heal care application. According to an embodiment, the application 134 may include at least one of applications designated to the electronic device 101 or the applications received from the external electronic device (e.g. server 106 and electronic device 104). According to various embodiments of the present disclosure, the control data for use in control of generating, changing, operating, and removing the window in response to the hardware or software key input of the electronic device or through the paired external input device may be stored in the application 134.

The input/output interface 140 delivers the command or data input by the user through with an input/output device (e.g. sensor, keyboard, and touchscreen) to the processor 120, memory 130, communication interface 160, and/or application control module through the bus 110. For example, the input/output interface 140 may provide the processor 120 with the data corresponding to the touch may by the user on the touchscreen. The input/output interface 140 may output the command or data (which is received from the processor 120, memory 130, communication interfaced 160, or the application control module through the bus 110) through the input/output device (e.g. speaker and display). For example, the input/out interface 140 may output the voice data processed by the processor 120 to the user through the speaker. The voice data is output through the speaker in the form of audible sound wave.

The display 150 may present various information (e.g. multimedia data and text data) to the user.

The communication interface 160 may establish a communication connection of the electronic device 101 with an external device (e.g. electronic device 104 and server 106). For example, the communication interface 160 connects to the network 162 through a wireless or wired link for communication with the external device. Examples of the wireless communication technology may include wireless fidelity (Wi-Fi), Bluetooth (BT), Near Field Communication (NFC), Global Positioning System (GPS), and cellular communication technology (e.g. Long Term Evolution (LTE), LTE-Advanced (LTE-A), Code Division Multiple Access (CDMA), Wideband CDMA (WCDMA), Universal Mobile Telecommunication System (UMTS), Wireless-Broadband (WiBro), and General System for Mobile communications (GSM)). Examples of the wired communication technology may include Universal Serial Bus (USB), High Definition Multimedia Interface (HDMI), Recommended Standard 232 (RS-232), and Plain Old Telephone Service (POTS).

According to an embodiment, the network 162 may be a telecommunication network. The communication network may include at least one of computer network, Internet, Internet of Things, and telephone network. According to an embodiment, the communication protocol between the electronic device 101 and an external device (e.g. transport layer protocol, data link layer protocol, and physical layer protocol) may be supported by at least one of the applications 134, API 133, middleware 132, kernel 131, and communication interface 160.

The application control module 170 may process at least part of the information acquired from other components (e.g. the processor 120, memory 130, input/output interface 140, and communication interface 160) and provide the processing result to the user. For example, the application control module 170 may check the information on the device connected to the electronic device 101, store the information on the connected device in the memory 130, and execute the application 134 based on the information of the connected device.

Although FIG. 1 is directed to the case where the processor 120 and the application control module 170 are configured separately, they can be integrally referred to as 'controller.' In the following description, the term 'controller' is used in the meaning of including the processor 120 and the application control module and, depending on the case, in the meaning that the application 134 stored in the memory 130 is executed by the processor 120 or the application control module 170.

Figure 2:
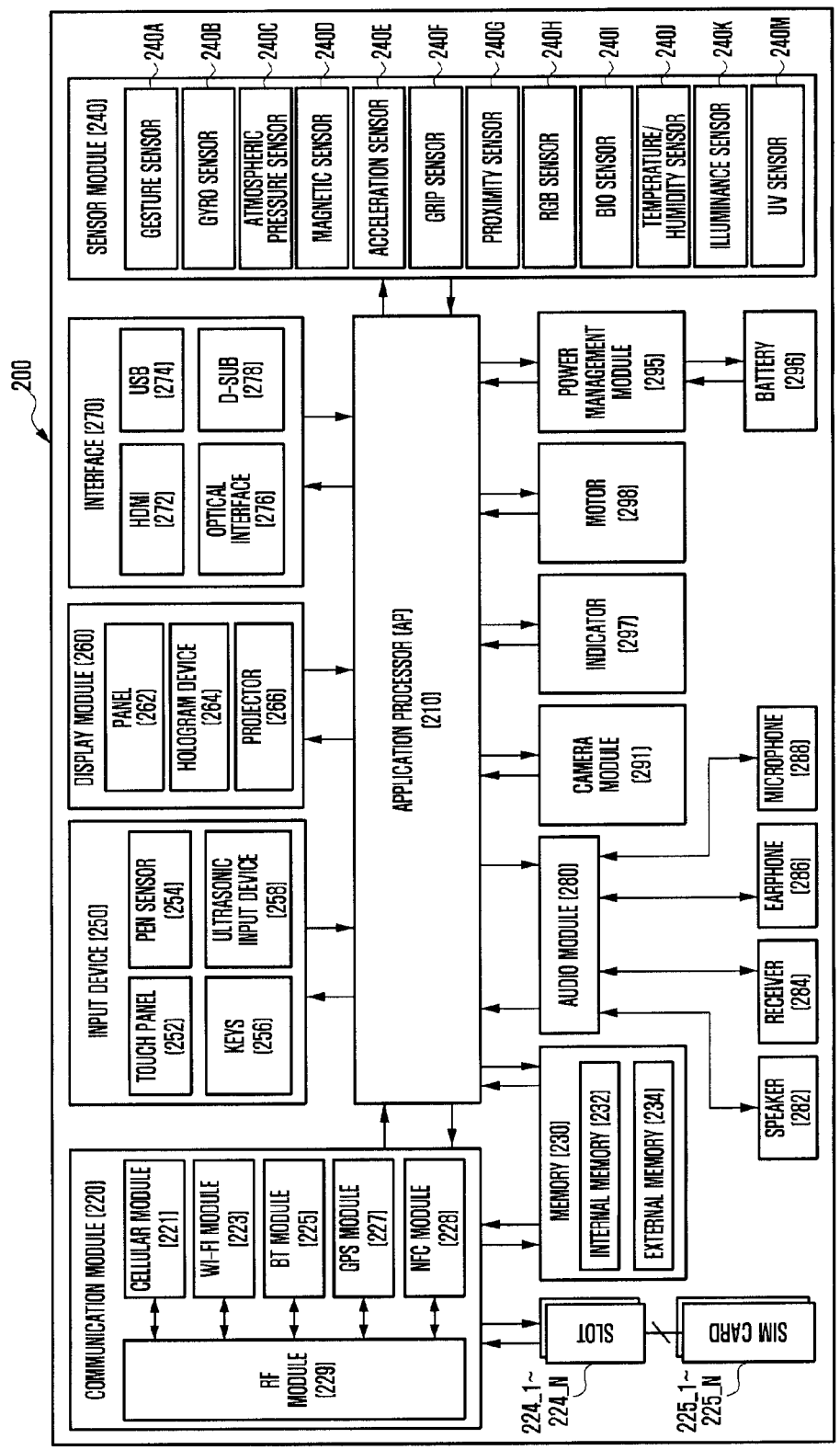
FIG. 2 is a block diagram illustrating a configuration of the electronic device according to an embodiment of the present disclosure.

FIG. 2 is a block diagram illustrating a configuration of the electronic device according to an embodiment of the present disclosure.

The electronic device 201 may be of the whole or a part of the electronic device 101. Referring to FIG. 2, the electronic device 201 may include an Application Processor (AP) 210, a communication module 220, a Subscriber Identity Module (SIM) card 225 1~N, a memory 230, a sensor module 240, an input device 250, a display 260, an interface 270, an audio module 280, a camera module 291, a power management module 295, a battery 296, an indicator 297, and a motor 298.

The AP 210 may operate an Operating System (OS) and/or application programs to control a plurality of hardware and/or software components connected to the AP 210 and perform data-processing and operations on multimedia data. For example, the AP 210 may be implemented in the form of System on Chip (SoC). According to an embodiment, the AP 210 may include a Graphic Processing Unit (GPU) (not shown).

The communication module 220 (e.g. communication interface 160) may perform data communication with other electronic devices (e.g. electronic device 104 and server 106) through a network. According to an embodiment, the communication module 220 may include a cellular module 221, a Wi-Fi module 223, a BT module 225, a GPS module 227, an NFC module 228, and a Radio Frequency (RF) module 229.

The cellular module 221 is responsible for voice and video communication, text messaging, and Internet access services through a communication network (e.g. LTE, LTE-A, CDMA, WCDMA, UMTS, WiBro, and GSM networks). The cellular module 221 may perform identification and authentication of electronic devices in the communication network using the SIM card 225_1~N. According to an embodiment, the cellular module 221 may perform at least one of the functions of the AP 210. For example, the cellular module 221 may perform at least a part of the multimedia control function.

According to an embodiment, the cellular module 221 may include a Communication Processor (CP). The cellular module 221 may be implemented in the form of SOC. Although the cellular module 221 (e.g. communication processor), the memory 230, and the power management module 295 are depicted as independent components separated from the AP 210, the present disclosure is not limited thereto but may be embodied in a way that the AP includes at least one of the components (e.g. cellular module 221).

According to an embodiment, each of the AP 210 and the cellular module 221 (e.g. communication processor) may load a command or data received from at least one of the components on a non-volatile or volatile memory and process the command or data. The AP 210 or the cellular module 221 may store the data received from other components or generated by at least one of other components in the non-volatile memory.

Each of the Wi-Fi module 223, the BT module 225, the GPS module 227, and the NFC module 228 may include a processor for processing the data it transmits/receives. Although the cellular module 221, the Wi-Fi module 223, the BT module 225, the GPS module 227, and the NFC module 228 are depicted as independent blocks; at least two of them (e.g. communication processor corresponding to the cellular module 221 and Wi-Fi processor corresponding to the Wi-Fi module 223) may be integrated in the form of SoC.

The RF module 229 is responsible for data communication, e.g. transmitting/receiving RF signals. Although not depicted, the RF module 229 may include a transceiver, a Power Amp Module (PAM), a frequency filter, and a Low Noise Amplifier (LNA). The RF module 229 also may include the elements for transmitting/receiving electric wave in free space, e.g. conductor or conductive wire. Although FIG. 2 is directed to the case where the Wi-Fi module 223, the BT module 225, the GPS module 227, and the NFC module 228 are sharing the RF module 229, the present disclosure is not limited thereto but may be embodied in a way that at least one of the Wi-Fi module 223, the BT module 225, the GPS module 227, and the NFC module 228 transmits/receives RF signals an independent RF module.

The SIM card 225 1~N may be designed so as to be inserted into a slot formed at a predetermined position of the electronic device. The SIM card 225 1~N may store unique identity information (e.g. Integrated Circuit Card Identifier (ICCID)) or subscriber information (e.g. International Mobile Subscriber Identity (IMSI)).

The memory 230 (e.g. memory 130) may include at least one of the internal memory 232 and an external memory 234. The internal memory 232 may include at least one of a volatile memory (e.g. Dynamic Random Access Memory (DRAM), Static RAM (SRAM), Synchronous Dynamic RAM (SDRAM) or a non-volatile memory (e.g. One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, and NOR flash memory)

According to an embodiment, the internal memory 232 may be a Solid State Drive (SSD). The external memory 234 may be a flash drive such as Compact Flash (CF), Secure Digital (SD), micro-SD, Mini-SD, extreme Digital (xD), and Memory Stick. The external memory 234 may be connected to the electronic device 201 through various interfaces functionally. According to an embodiment, the electronic device 201 may include a storage device (or storage medium) such as hard drive.

The sensor module 240 may measure physical quantity or check the operation status of the electronic device 201 and convert the measured or checked information to an electric signal. The sensor module 240 may include at least one of gesture sensor 240A, Gyro sensor 240B, barometric sensor 240C, magnetic sensor 240D, acceleration sensor 240E, grip sensor 240F, proximity sensor 240G, color sensor 240H (e.g. Red, Green, Blue (RGB) sensor), bio sensor 240I, temperature/humidity sensor 240J, illuminance sensor 240K, and Ultra Violet (UV) sensor 240M. Additionally or alternatively, the sensor module 240 may include E-nose sensor (not shown), Electromyography (EMG) sensor (not shown), Electroencephalogram (EEG) sensor (not shown), Electrocardiogram (ECG) sensor (not shown), Infrared (IR) sensor (not shown), iris sensor (not shown), and fingerprint sensor (not shown). The sensor module 240 may further include a control circuit for controlling at least one of the sensors included therein.

The input device 250 may include a touch panel 252, a (digital) pen sensor 254, keys 256, and an ultrasonic input device 258. The touch panel 252 may be one of capacitive, resistive, infrared, microwave type touch panel. The touch panel 252 may include a control circuit. In the case of the capacitive type touch panel, it is possible to detect physical contact or approximation. The touch panel 252 may further include a tactile layer. In this case, the touch panel 252 may provide the user with haptic reaction.

The (digital) pen sensor 254 may be implemented with a sheet with the same or similar way as touch input of the user or a separate recognition sheet. The keys 256 may include physical buttons, optical key, and keypad. The ultrasonic input device 258 is a device capable of checking data by detecting sound wave through a microphone 288 and may be implemented for wireless recognition. According to an embodiment, the electronic device 201 may receive the user input made by means of an external device (e.g. computer or server) connected through the communication module 220.

The display 260 (e.g. display module 150) may include a panel 262, a hologram device 264, and a projector 266. The panel 262 may be a Liquid Crystal Display (LCD) panel or an Active Matrix Organic Light Emitting Diodes (AMOLED) panel. The panel 262 may be implemented so as to be flexible, transparent, and/or wearable. The panel 262 may be implemented as a module integrated with the touch panel 252. The hologram device 264 may present 3-dimensional image in the air using interference of light. The projector 266 may project an image to a screen. The screen may be placed inside or outside the electronic device. According to an embodiment, the display 260 may include a control circuit for controlling the panel 262, the hologram device 264, and the projector 266.

The interface 270 may include a High-Definition Multimedia Interface (HDMI) 272, a Universal Serial Bus (USB) 274, an optical interface 276, and a D0subminiature (D-sub) 278. The interface 270 may include the communication interface 160 as shown in FIG. 1. Additionally or alternatively, the interface 270 may include a Mobile High-definition Link (MHL) interface, a SD/MMC card interface, and infrared Data Association (irDA) standard interface.

The audio module 280 may convert sound to electric signal and vice versa. At least a part of the audio module 280 may be included in the input/output interface 140 as shown in FIG. 1. The audio module 280 may process the audio information input or output through the speaker 282, the receiver 284, the earphone 286, and the microphone 288.

The camera module 291 is a device capable of taking still and motion pictures and, according to an embodiment, includes at least one image sensor (e.g. front and rear sensors), a lens (not shown), and Image Signal Processor (ISP) (not shown), and a flash (e.g. LED or xenon lamp) (not shown).

The power management module 295 may manage the power of the electronic device 201. Although not shown, the power management module 295 may include a Power Management Integrated Circuit (PMIC), a charger Integrated Circuit (IC), a battery, and a battery or fuel gauge.

The PMIC may be integrated into an integrated circuit or SoC semiconductor. The charging may be classified into wireless charging and wired charge. The charger IC may charge the battery and protect the charger against overvoltage or overcurrent. According to an embodiment, the charger IC may include at least one of wired charger and wireless charger ICs. Examples of the wireless charging technology includes resonance wireless charging and electromagnetic wave wireless charging, and there is a need of extra circuit for wireless charging such as coil loop, resonance circuit, and diode.

The battery gauge may measure the residual power of the battery 296, charging voltage, current, and temperature. The battery 296 may store or generate power and supply the stored or generated power to the electronic device 201. The battery 296 may include a rechargeable battery or a solar battery.

The indicator 297 may display operation status of the electronic device 201 or a part of the electronic device, booting status, messaging status, and charging status. The motor 298 may converts the electronic signal to mechanical vibration. Although not shown, the electronic device 201 may include a processing unit (e.g. GPU) for supporting mobile TV. The processing unit for supporting the mobile TV may be able to processing the media data abiding by the broadcast standards such Digital Multimedia Broadcasting (DMB), Digital Video Broadcasting (DVB), and media flow.

The above enumerated components of the electronic device of the present disclosure may be implemented into one or more parts, and the names of the corresponding components may be changed depending on the kind of the electronic device. The electronic device of the present disclosure may include at least one of the aforementioned components with omission or addition of some components. The components of the electronic device of the present disclosure may be combined selectively into an entity to perform the functions of the components equally as before the combination.

The term "module" according to the embodiments of the disclosure, means, but is not limited to, a unit of one of software, hardware, and firmware or any combination thereof. The term "module" may be used interchangeably with the terms "unit," "logic," "logical block," "component," or "circuit." The term "module" may denote a smallest unit of component or a part thereof. The term "module" may be the smallest unit of performing at least one function or a part thereof. A module may be implemented mechanically or electronically. For example, a module may include at least one of Application-Specific Integrated Circuit (ASIC) chip, Field-Programmable Gate Arrays (FPGAs), and Programmable-Logic Device known or to be developed for certain operations.

Figure 3:
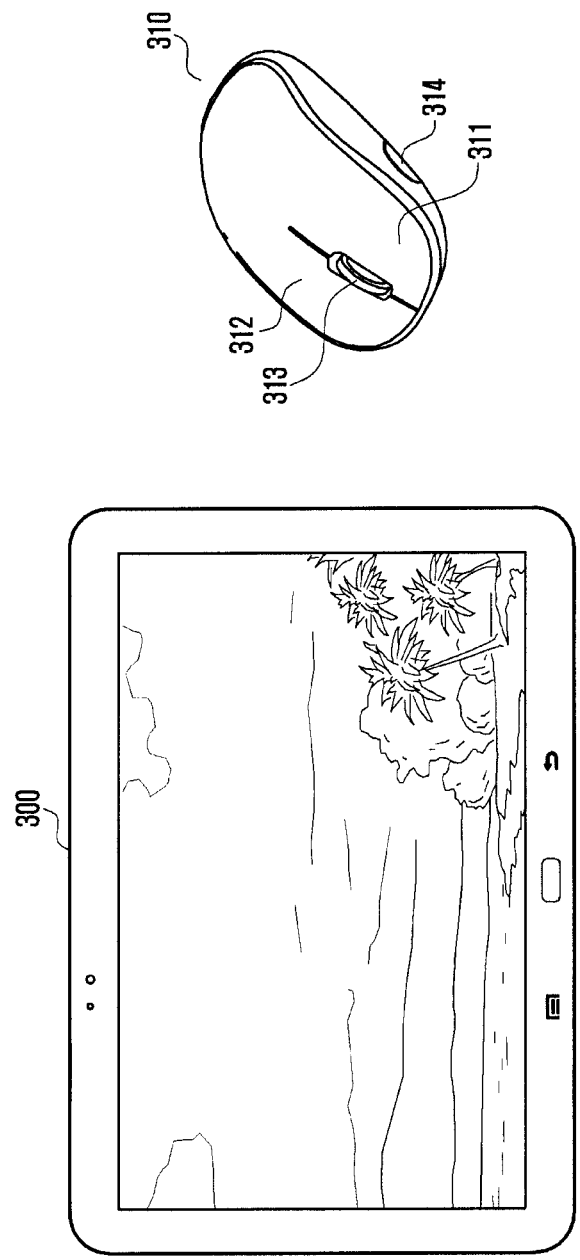
FIG. 3 is diagram illustrating an electronic device paired with an external input device according to an embodiment of the present disclosure.

FIG. 3 is diagram illustrating an electronic device in communication with an external input device according to an embodiment of the present disclosure. Here, the electronic device 300 may be configured as shown in FIGS. 1 and 2.

Referring to FIGS. 1 and 3, the electronic device 300 may include the display 150 relatively large in size and receive a signal generated by an external input device (e.g. a mouse, a joystick, an electronic pen such as a stylus pen, and a keyboard) through the input/output interface 140. In FIG. 3, the external input device is the mouse 310. The mouse 310 includes a left button 311 for left click, a right button 312 for right click, and a scroll wheel 313 for scrolling and click operations. The mouse 310 also includes a left side wheel formed in the same shape as the scroll wheel for use by the right-handed person. According to a certain embodiment of the present disclosure, the electronic device 300 generates a window in accordance with manipulation of the left wheel 314 of the mouse 310. According to a certain embodiment of the present disclosure, if a first input is followed by a second input subsequently by means of the left wheel 314 of the mouse 310, this is regarded as a request for terminating the window generation function.

In FIG. 3, it is preferred to connect the mouse 310 and the electronic device 300 through a wireless communication link. However, it is obvious to those skilled in the art that the mouse 310 and the electronic device 300 can be connected through a cord. Although the embodiment of FIG. 3 is directed to the case where the external input device connected to the electronic device 300 is the mouse 310, other type of input devices such as an electronic pen and a joystick can be connected instead of the mouse 310. Also, the electronic device may be equipped with a multifunction key implemented in hardware or software for generating the same input signal without connection of the external input device. In this case, the user's touch gesture input or pinch gesture input may replace the mouse input.

Figure 4:
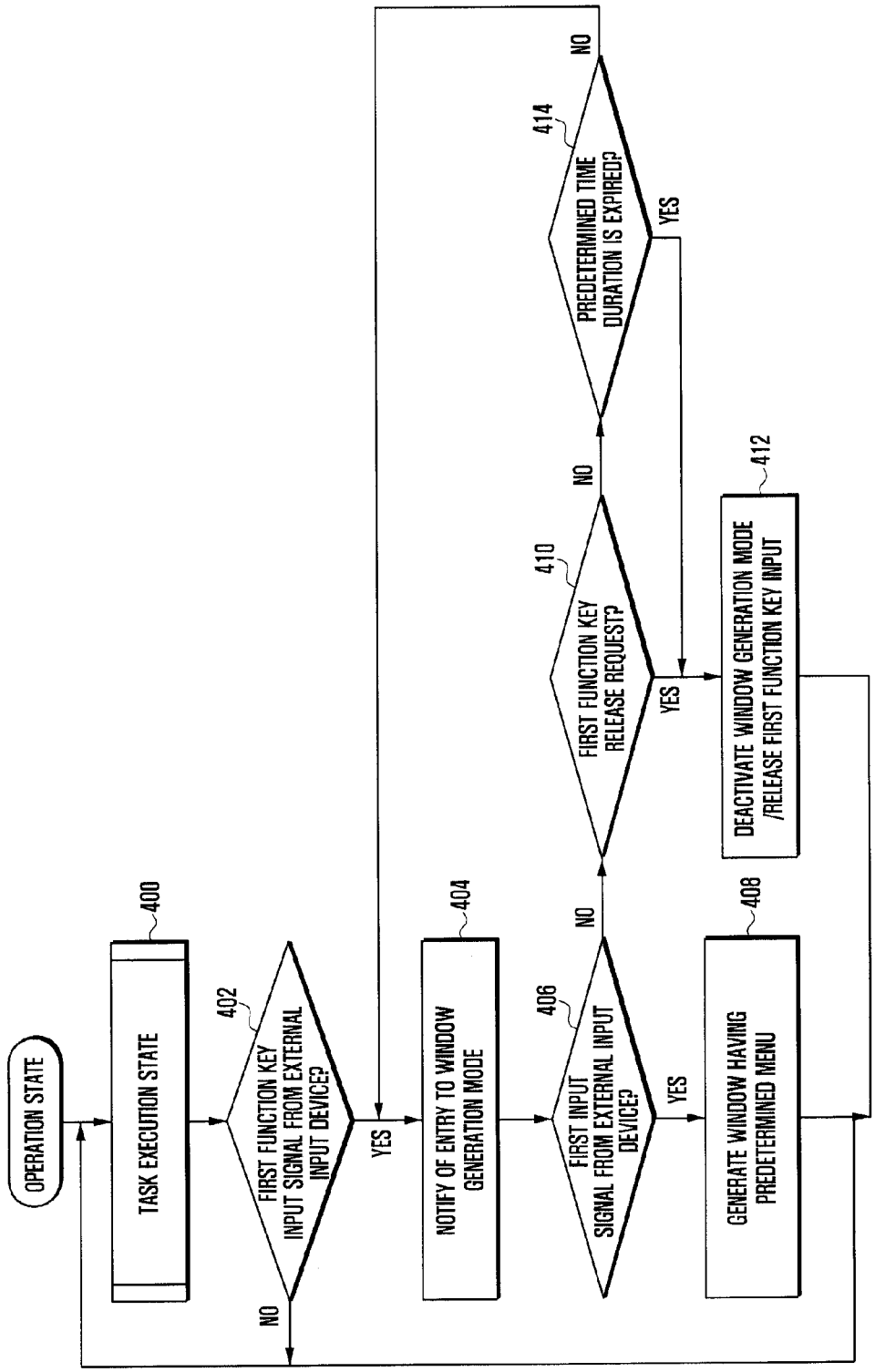
FIG. 4 is a flowchart illustrating a window generation procedure based on the signal input by means of an external input device connected to an electronic device according to an embodiment of the present disclosure.

FIG. 4 is a flowchart illustrating a window generation procedure based on the signal input by means of an external input device connected to the electronic device according to an embodiment of the present disclosure.

As shown in FIG. 4, if the electronic device is in an operation state, which indicates that the electronic device 101 is in the power-on state during which the electronic device 101 is waiting for a user input or a certain event or executing a function requested by the user. Then, the control unit checks that the electronic device is executing a task at step 400. For example, if a text messaging application program is running, the display 150 may be displaying the execution screen of the application program. Also, in this state, the electronic device having the display 150 such as a smartphone, a tablet computer, and a laptop computer may display an initial screen, e.g. a main screen and a background screen. It should be noted that other type of tasks can be executed in the operation state without limited to the above examples.

Thereafter, the control unit monitors the input/output interface 140 to detect a signal from the external device and, if a signal is detected, determines whether the signal is a first function key input signal at step 402. Here, the first function key input signal may be the signal generated by clicking the left wheel 314 of the mouse 310 of FIG. 3. In the case that no external input device is connected, the first function key input signal may be the signal generated by means of a hardware or software key of the electronic device 101. For explanation convenience, the description is made under the assumption that the first function key input signal is the signal made by clicking the left wheel 314 of the mouse 310.

If the detected signal is the first function key input signal at step 402, the control unit controls the display 150 to display an indicator to notify the user of the entry to the window generation mode at step 404. At this time, the entry to the window generation mode may be notified to the user with an icon or a text balloon or change of the icon around the pointer of the mouse or top left, bottom left, top right, bottom right, or center of the screen. According to a certain embodiment, the entry to the window generation mode may be notified to the user in such a way by blurring the current execution screen of the display 150.

Next, the control unit monitors the input/output interface 140 to detect a signal from the external device and, if a signal is detected or received from the external device, determines whether the signal is a first input signal at step 406. Here, the first input signal of the external device is a window generation request signal which is generated in various manners. According to a certain embodiment, the first input signal, i.e. the window generation request signal, is generated by clicking the left button 311 or the right button 312 of the mouse 310. According to a certain embodiment, the first input signal requesting for window generation is generated by clicking the left button 311 or the right button 312 of the mouse 310 and holding the click for a predetermined time duration. According to a certain embodiment, the first input signal requesting for window generation is generated by clicking the left button 311 or the right button 312 of the mouse 310 and dragging the mouse in the state of holding the click. According to a certain embodiment, the first input signal requesting for window generation is generated by clicking the scroll wheel 313 of the mouse.

The aforementioned examples of generating the first input signal requesting for window generation are described in details hereinafter.

According to a certain embodiment, in the case that the first input signal is generated by clicking the left button 311 or the right button 312 of the mouse 310, the window is generated in a fixed size always. For example, the size "width×length" of the generated window may be predetermined for a subsequent display. In this case, the first input signal may be understood as a signal to generate a window having a predetermined size which is set as a default. In this case, the user may not change or designate the size of the window generated initially.

Figure 7A:
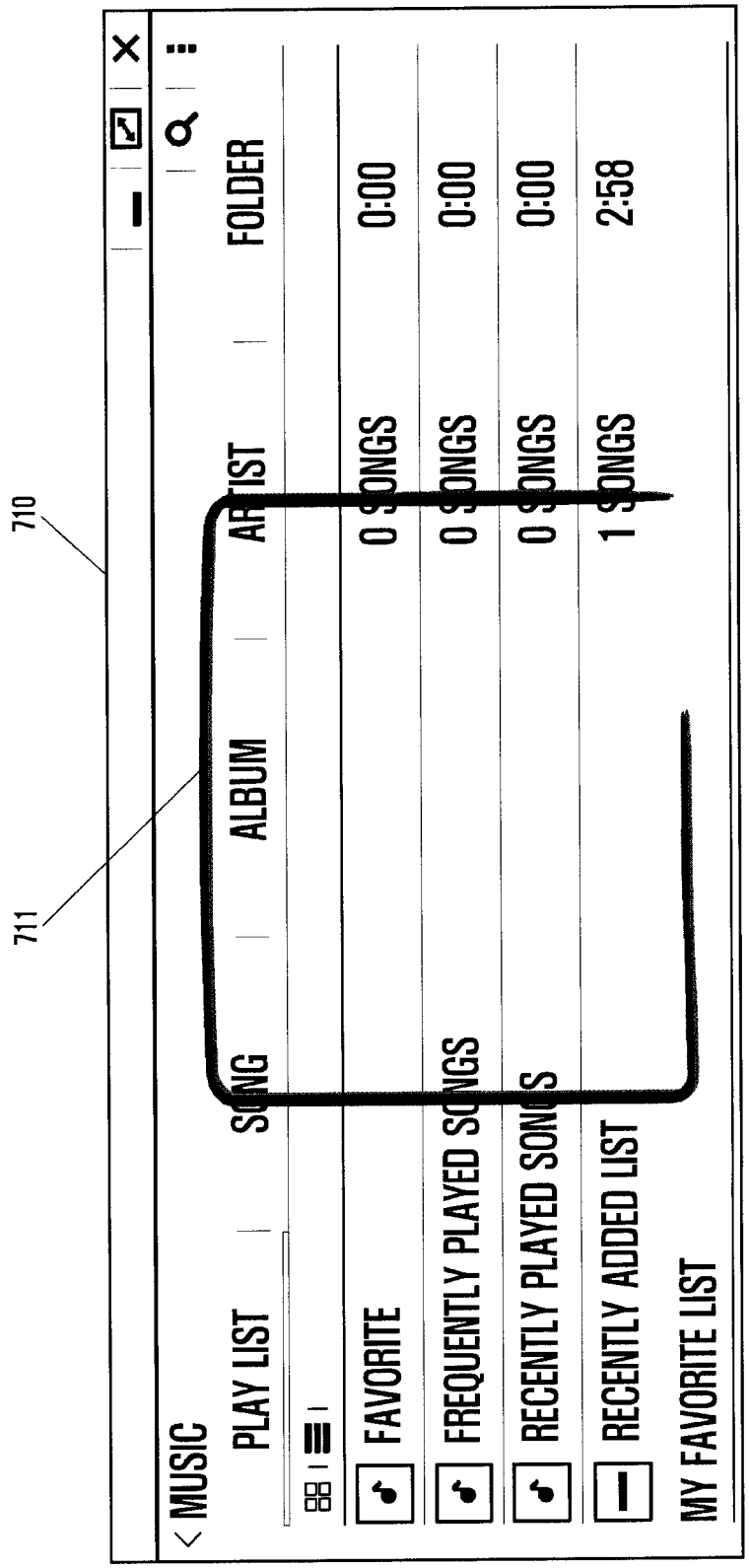
FIG. 7A and FIG. 7B are diagrams illustrating exemplary screen displays for explaining window generation in response to a dragging gesture according to an embodiment of the present disclosure.
Figure 7B:
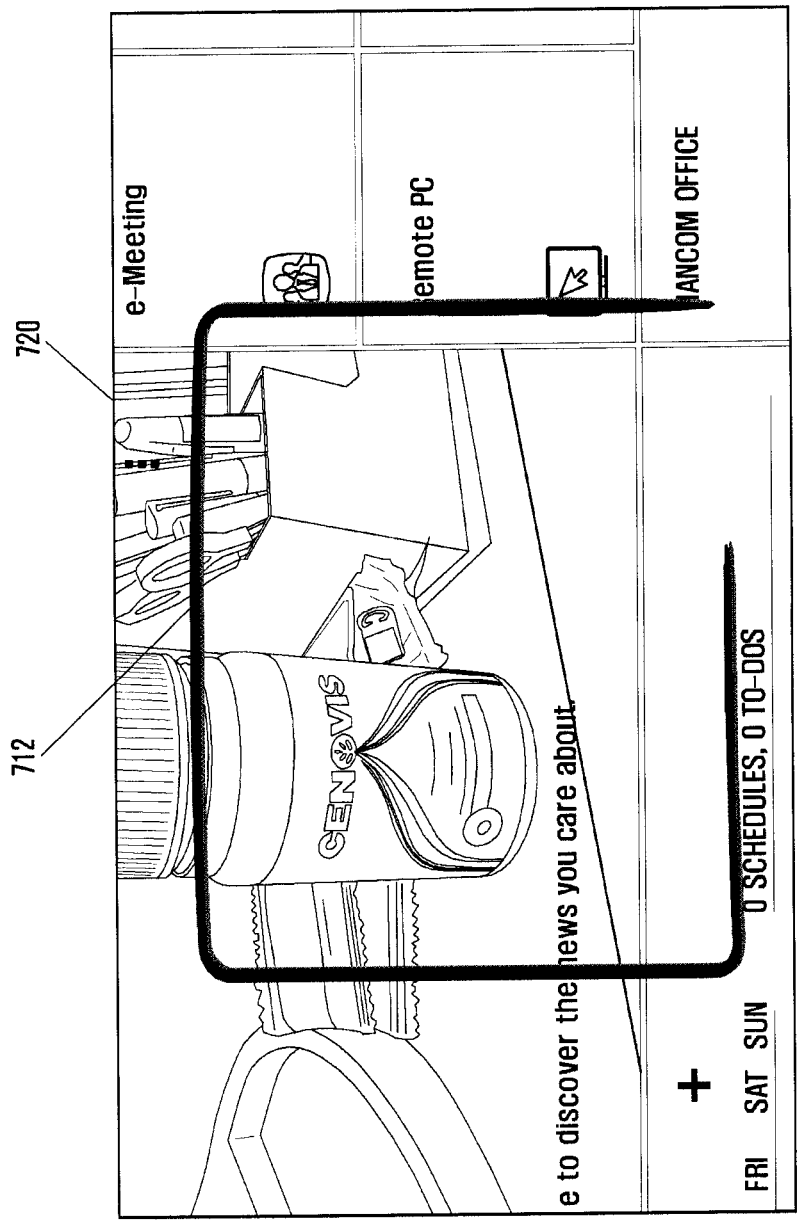

According to a certain embodiment, in the case that the first input signal is generated by clicking the left button 311 or the right button 312 of the mouse 310 and dragging the mouse in the state of holding the click, the window size may be selectively adjusted by the user. A description is made thereof with reference to FIGS. 7A and 7B. FIGS. 7A and 7B are diagrams illustrating exemplary screen displays for explaining window generation in response to a dragging gesture according to an embodiment of the present disclosure.

Referring to FIGS. 7A and 7B, the user selects the first function key in the course of executing a task, e.g. displaying images relating to a music application on the display 150, and then makes a drag gesture on the screen using a mouse or other input device after the entry to the window generation mode is notified. In FIG. 7A, the music application execution screen 710 is displayed on the display 150. If a drag input gesture which defines the boundary of a window is made, for example, by pointing and clicking the mouse at a given location on the screen and dragging the mouse pointer to a particular direction while holding the click button, a line is drawn in correspondence to the drag gesture as denoted by reference number 711. The area delimited by the drag line 711 is determined as the window with the size of "width×length." FIG. 7B shows an exemplary case where the user selects the first function key, in the state that a schedule organizer application execution screen is displayed on the display 150, and then makes a drag input gesture after the entry to the window generation mode is notified. In the exemplary case of FIG. 7B, the schedule organizer application execution screen 720 is displayed on the display 150. If a drag gestured is made in this state, a line is drawn in correspondence to the drag gesture as denoted by reference number 712. The area delimited by the drag line 712 is determined as the window with the size "width×length."

In the above description, the window size "width×length" is selectively changed or determined by the drag gesture. In the case that the window size is fixed to a default size, however, a default size window is generated independently of the drag gesture.

Figure 7C:
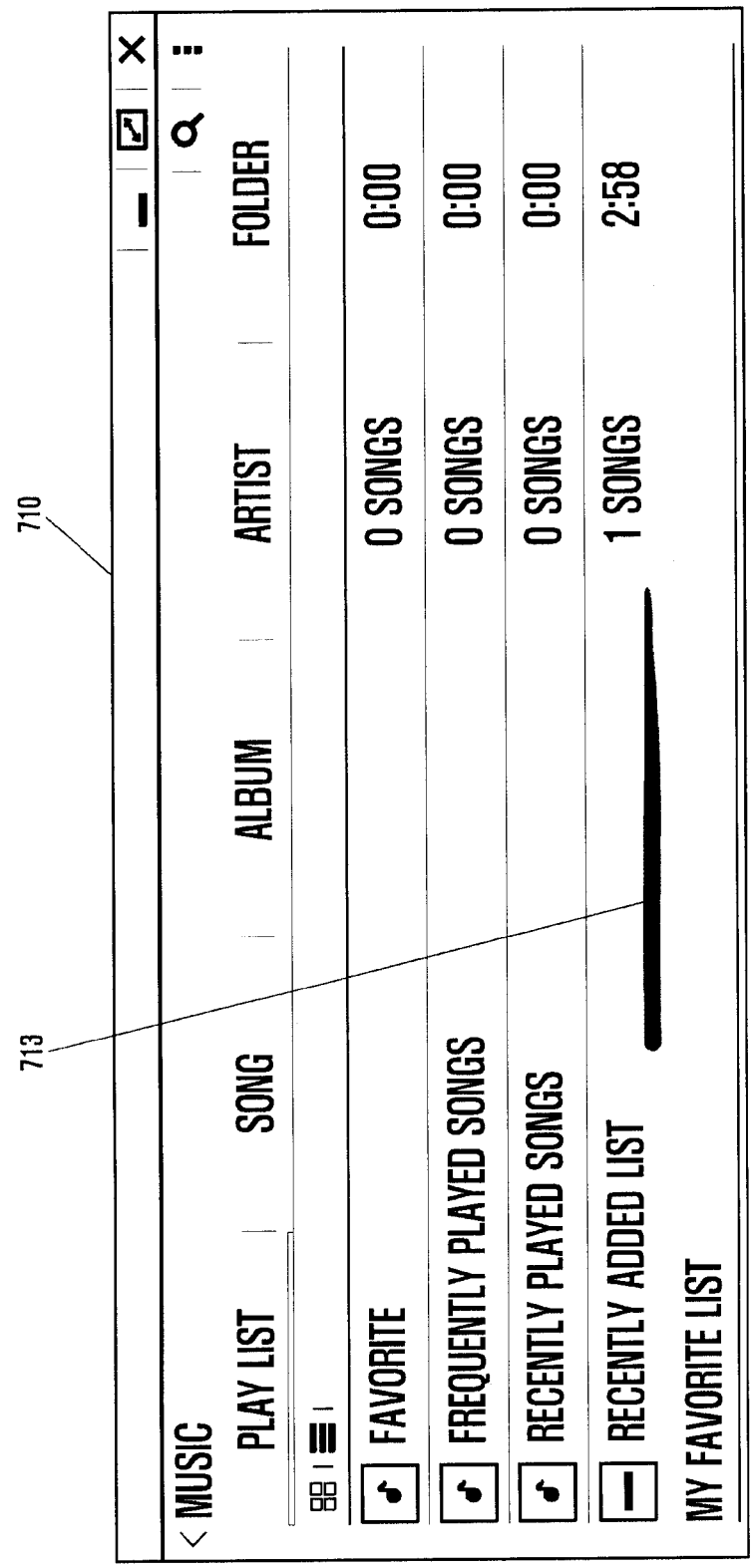
FIG. 7C and FIG. 7D are diagrams illustrating exemplary screen displays for explaining window generation in response to a horizontal stroke signal from an external input device according to an embodiment of the present disclosure.
Figure 7D:
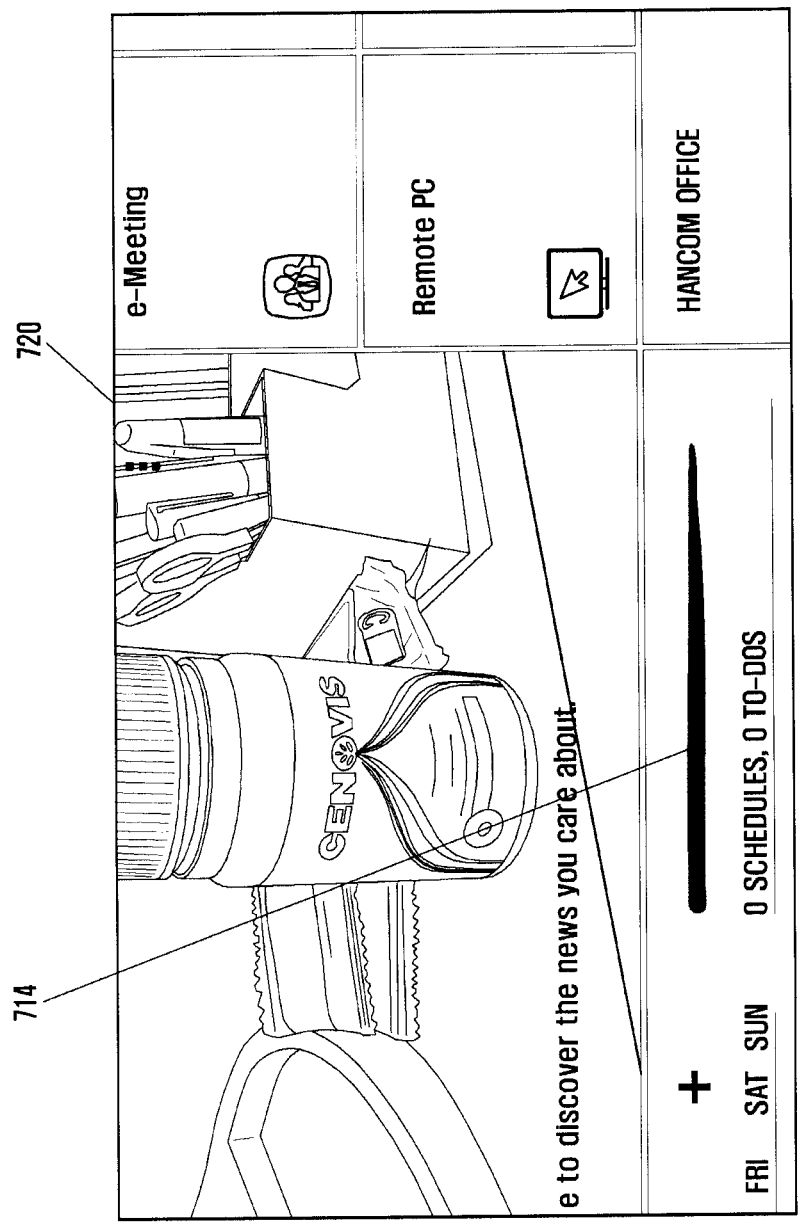

According to another embodiment, the window size "width×length" may be determined according to the length of a horizontal or vertical line drawn by the drag gesture. A description is made thereof with reference to accompanying drawings 7C and 7D. FIGS. 7C and 7D are diagrams illustrating exemplary screen displays for explaining window generation in response to a horizontal stroke signal from an external input device according to an embodiment of the present disclosure.

FIG. 7C shows an exemplary case where the first function key input signal is detected in the state that a music application execution screen is displayed and then a horizontal direction stroke signal is received from the external input device 310 after notification of the entry to the window generation mode. In FIG. 7C, the music application execution screen 710 is displayed on the display unit 150. In this state, if a horizontal stroke signal is input, the length of the horizontal stroke is presented as denoted by reference number 713. The horizontal stroke length determines the width of the window to be generated. If a vertical direction stroke signal is input, the vertical stroke length determines the length of the window to be generated. As an another example, FIG. 7D shows an exemplary case where the first function key input signal is detected in the state that a schedule organizer application execution screen is displayed and then a horizontal stroke signal is received from the external input device 310 subsequently after notification of the entry to the window generation mode. In FIG. 7D, the schedule organizer application execution screen 720 is displayed on the display 150. If the horizontal stroke signal is input from the external input device 310 in this state, the horizontal stroke length is presented as denoted by reference number 714. The horizontal stroke length determines the width of the window to be generated. If a vertical stroke signal is input, the vertical stroke length determines the length of the window to be generated.

If one of the width and length of the window is determined based on one the horizontal or vertical stroke length, the other information is determined automatically according to a predetermined aspect ratio. For example, if the horizontal stroke length is 4 cm, the width of the window is determined as 4 cm. In this case, the length of the window is determined automatically according to a predetermined aspect ratio. Likewise, if the vertical stroke length is 3 cm, the length of the window is determined as 3 cm. In this case, the width of the window is determined automatically according to a predetermined aspect ratio.

In the case of using the diagonal stroke as well as the horizontal and vertical strokes, a diagonal stroke length may determine the width and length of the window to be generated. Note that a user can apply a directional stroke or any input gesture using a mouse, a touch screen and a stylus pen, etc. For example, if a diagonal stroke signal is received, the control unit acquires the horizontal and vertical length based on the diagonal length and determines the width and length of the window based on the horizontal and vertical lengths.

The above description is directed to the case whether the width and length of the window is determined in correspondence to the horizontal or vertical stroke signal. In the case that the default size of the window is configured, however, the window is generated with the default size independently of the stroke length.

As described above, if the first input signal received from the mouse 310 as the external input device, the control unit generates and displays a window with a predetermined menu on the display 150 at step 408. After displaying the window, the control unit may detect that the first function key input signal ends. If the first function key input signal ends, the control unit controls such that the window generation mode entry indication ends.

Figure 8A:
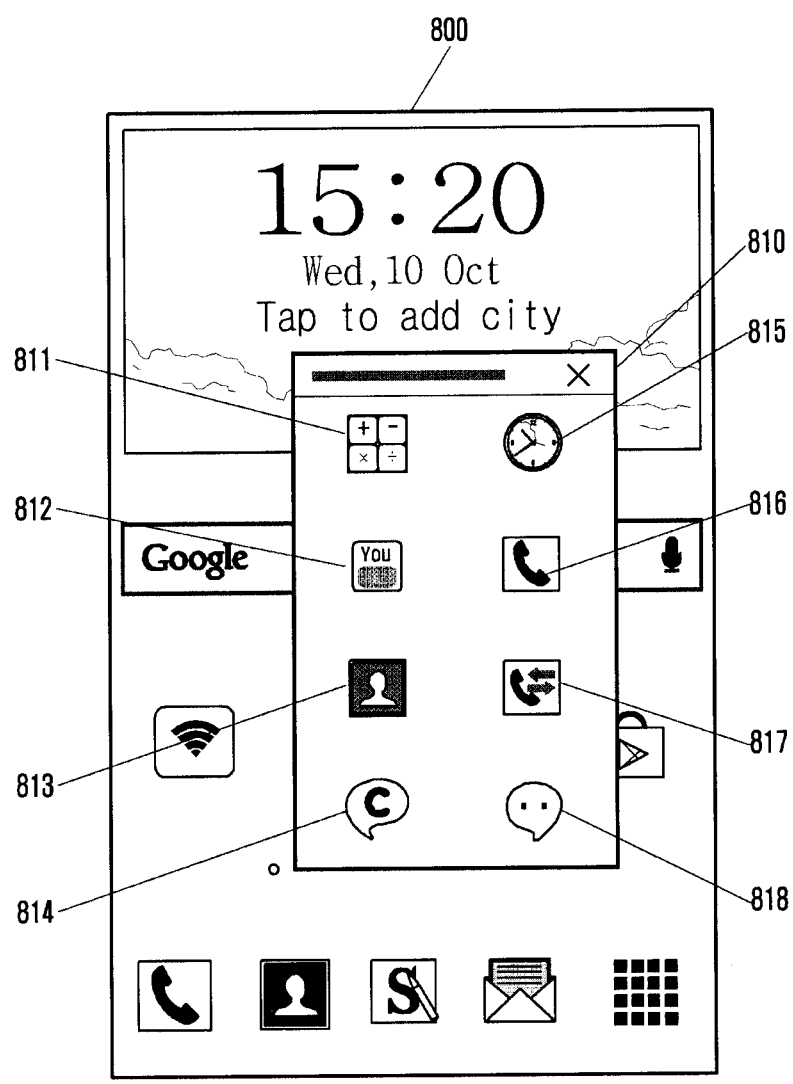
FIG. 8A is a diagram illustrating an exemplary screen display for explaining the operation of displaying a window on the background screen according to an embodiment of the present disclosure.

A description is made of the procedure of displaying a window with reference to FIG. 8A. FIG. 8A is a diagram illustrating an exemplary screen display for explaining the operation of displaying a window on the background screen according to an embodiment of the present disclosure. The window 810 includes a plurality of icons 811, 812, 813, 814, 815, 816, 817, and 818 corresponding to different functions or application programs. Although FIG. 8A is directed to the case where only the icons are arranged, data files may be arranged in alternate embodiment. For example, in the case of the window of a folder, the window may contain different data located in the folder.

Figure 8B:
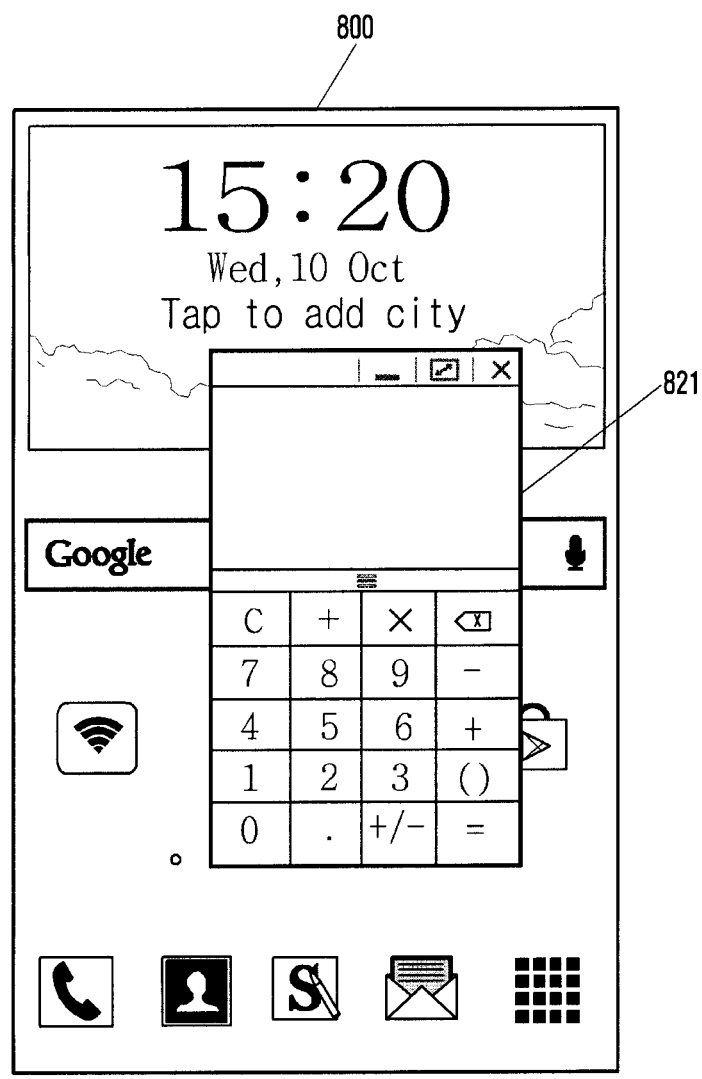
FIG. 8B is a diagram illustrating an exemplary screen display presenting the calculator application execution window on the display according to an embodiment of the present disclosure.

If one of the icons, e.g. the calculator icon 811, is selected from the window in the state of FIG. 8A, the control unit may retrieve the calculator data and change to a calculator application execution window as shown in FIG. 8b.

Figure 8C:
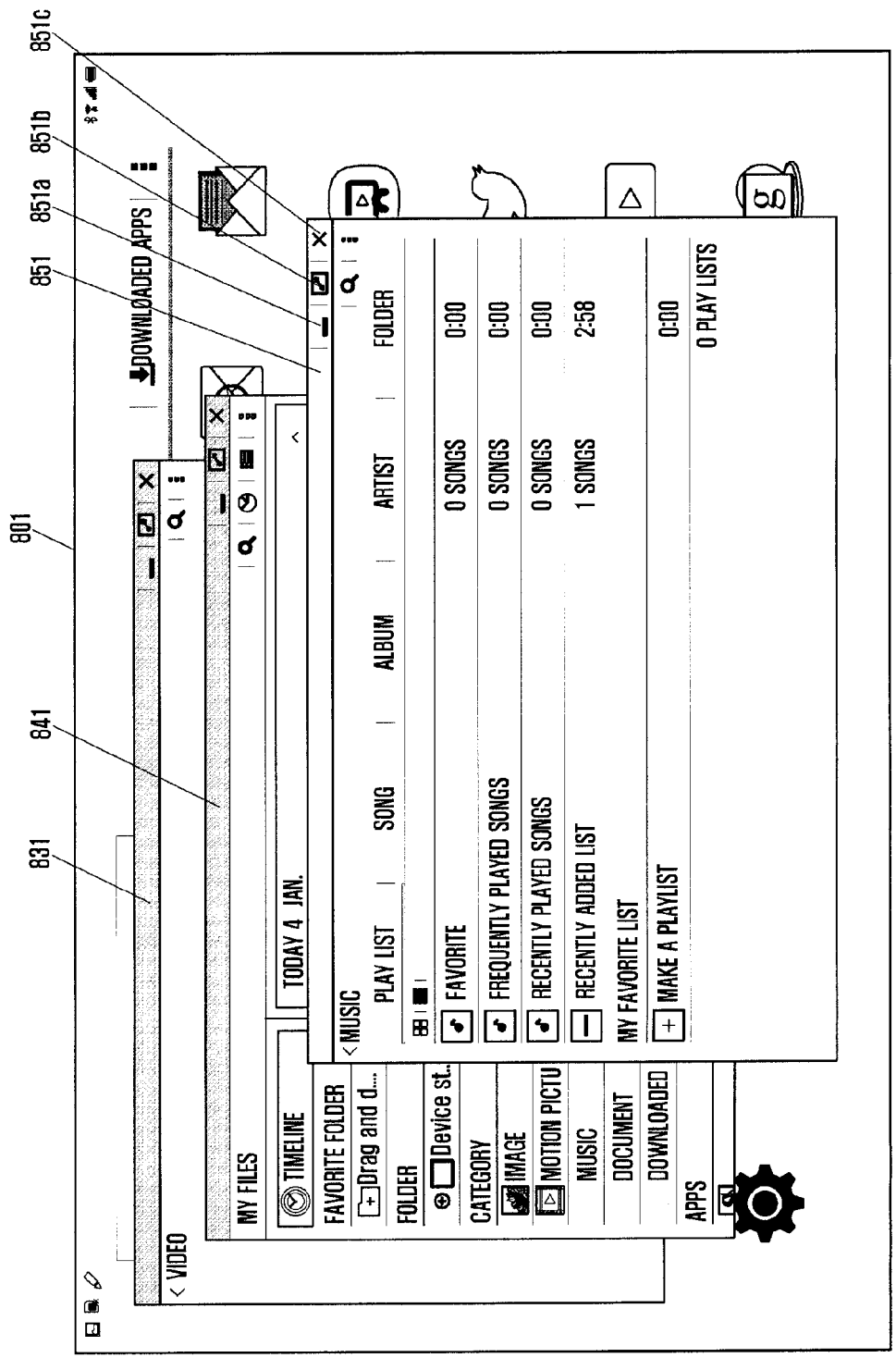
FIG. 8C is a diagram illustrating an exemplary screen display for explaining the operation of displaying two or more windows according to an embodiment of the present disclosure.

According to various embodiments of the present disclosure, the electronic device may generate two or more windows using the above methods of generating windows. A description is made thereof with reference to FIG. 8C. FIG. 8C is a diagram illustrating an exemplary screen display for explaining the operation of displaying two or more windows according to an embodiment of the present disclosure.

Referring to FIG. 8C, three windows 831, 841, and 851 are displayed on the screen. Although they present different data, the three windows are identical in structure basically. Each window has a state indication bar including has a minimization button 851a for hiding the window, a full screen button 851b for extending the corresponding window to the full screen, and a close button 851c for closing the corresponding window. Each of the windows 831, 841, and 851 is displayed in the same manner as an application execution screen is displayed as shown in FIG. 8b in response to the selection of the icon corresponding thereto in the menu window as shown in FIG. 8a.

Returning back to FIG. 4, if the detected signal is not the first input signal from the external device at step 406, the control unit determines whether the signal is a first function key release signal at step 410. If the detected signal is the first function key release signal, the control unit deactivates the window generation mode indication activated at step 404 and releases the first function key input at step 412.

The first function key release request may be generated in various manners. For example, the first function key release request may be generated by reselecting or performing the first function key used to request for the window generation mode entry again. For example, in the case that the click gesture or the click and hold gesture on the left button 311 or right button 312 of the mouse 310 is configured as the first function key input, if the same gesture is made again, this is regarded that the as the first function key release request. Other key manipulation can be configured for the first function activation and deactivation in similar manner.

If the detected signal is not the first function key release signal at step 410, the control unit determines whether a predetermined time duration has expired at step 414. Here, the predetermined time period may be set to a value variable in effort to save the battery or power consumption of the electronic device 101 (e.g. 5, 7, or 10 seconds). If the predetermined time has expired, the procedure goes to step 412. Here, if the predetermined time has expired, this means that neither the first input signal for generating a window is received nor the first function release request is not received within the predetermined time. Step 414 is required to prevent the electronic device 101 from waiting the first input signal for excessively long time. Accordingly, if it is determined that this step is not necessary, step 414 may be omitted in the manufacturing phase of the electronic device 101.

Figure 5:
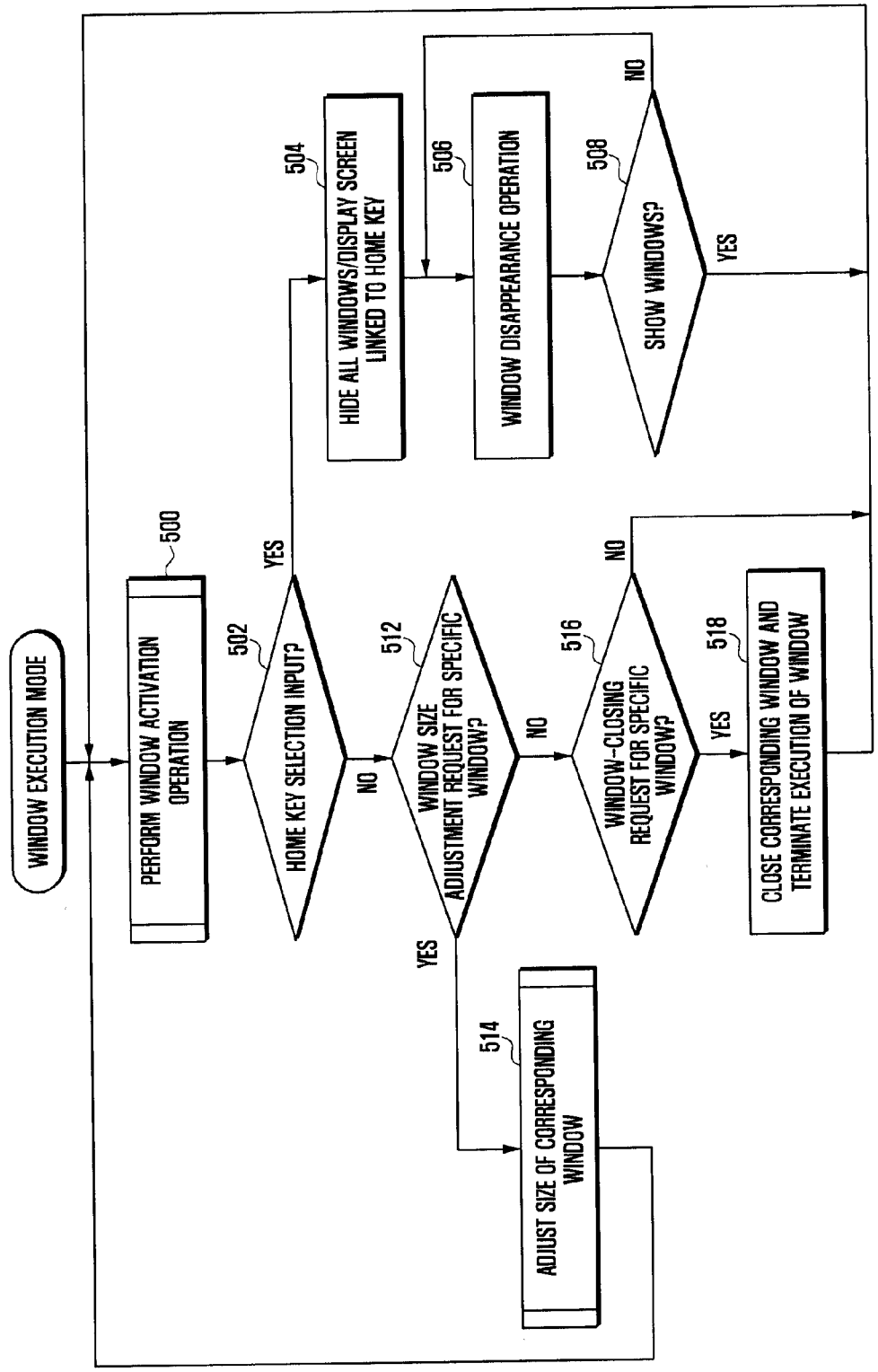
FIG. 5 is a flowchart illustrating the operation of an electronic device in the window execution mode according to an embodiment of the present disclosure.

FIG. 5 is a flowchart illustrating the operation of the electronic device in the window execution mode according to another embodiment of the present disclosure.

The embodiment of FIG. 5 is described with reference to FIGS. 1 to 3. In FIG. 5, the window execution mode is the state where a window is activated in the course of step 400 of FIG. 4.

Referring to FIG. 5, the control unit performs a window activation operation at step 500 which represents a state where one or more windows are displayed on the display 150. Here, the window may be displayed as a full screen window or a non-full screen window.

The control unit monitors the input/output interface 140 to detect an input signal and, if a signal is detected, determines whether the signal is a home key selection signal at step 502. Here, the home key may be a shortcut to show a specific screen of a smartphone or a tablet computer. This operation can be understood similarly in any type of electronic device having a display 150 and a home key or the like regardless of the structure and name of the electronic device.

If the input signal is the home key selection signal at step 502, the procedure goes to step 504 and, otherwise, step 512. A description is made of the case when the procedure goes to step 504 due to the detection of the home key selection signal. At step 504, the control unit hides all the windows and shows the screen linked to the home key on the display 150. The screen linked to the home key may be one of the default screens as described above. Although the windows disappear when the home key selection signal is detected, this operation does not mean that the windows are closed. If a window is hidden, this means that the corresponding window can be called to appear. The corresponding windows may be presented in the forms of icons or disappear on the screen of the display 150.

After hiding the windows and displaying the screen liked to the home key on the display 150, the control unit performs a window disappearance operation at step 506. The window disappearance state operation is identical with or similar to the operation at step 400 of FIG. 4. Thereafter, the control unit monitors to detect a request for showing the hidden windows at step 508 while performing the window disappearance state operation. If the request for showing the windows back is detected at step 508, the control unit returns the procedure to step 500 and, otherwise, step 506.

Meanwhile, if the input signal is not the home key selection signal at step 502, the control unit determines whether the input signal is a window size adjustment request for a specific window at step 512. If the input signal is the window size adjustment request for a specific window, the control unit adjusts the size of the corresponding window at step 514. The window size adjustment operation becomes clearer in the description later with reference to FIG. 6.

If the input signal is not the window size adjustment request at step 512, the control unit determines whether the input signal is a window-closing request for a specific window at step 516. Here, if the window-closing request is the request for closing the corresponding window. Since the window closing operation has been described with reference to FIG. 8C, detailed description thereof is omitted herein. If the input signal is the window-closing request at step 516, the control unit closes the corresponding window and terminates the corresponding application at step 518. If there are two or more windows, other windows are maintained although the corresponding window is closed. After forming step 518, the control unit returns the procedure to step 500.

Figure 6:
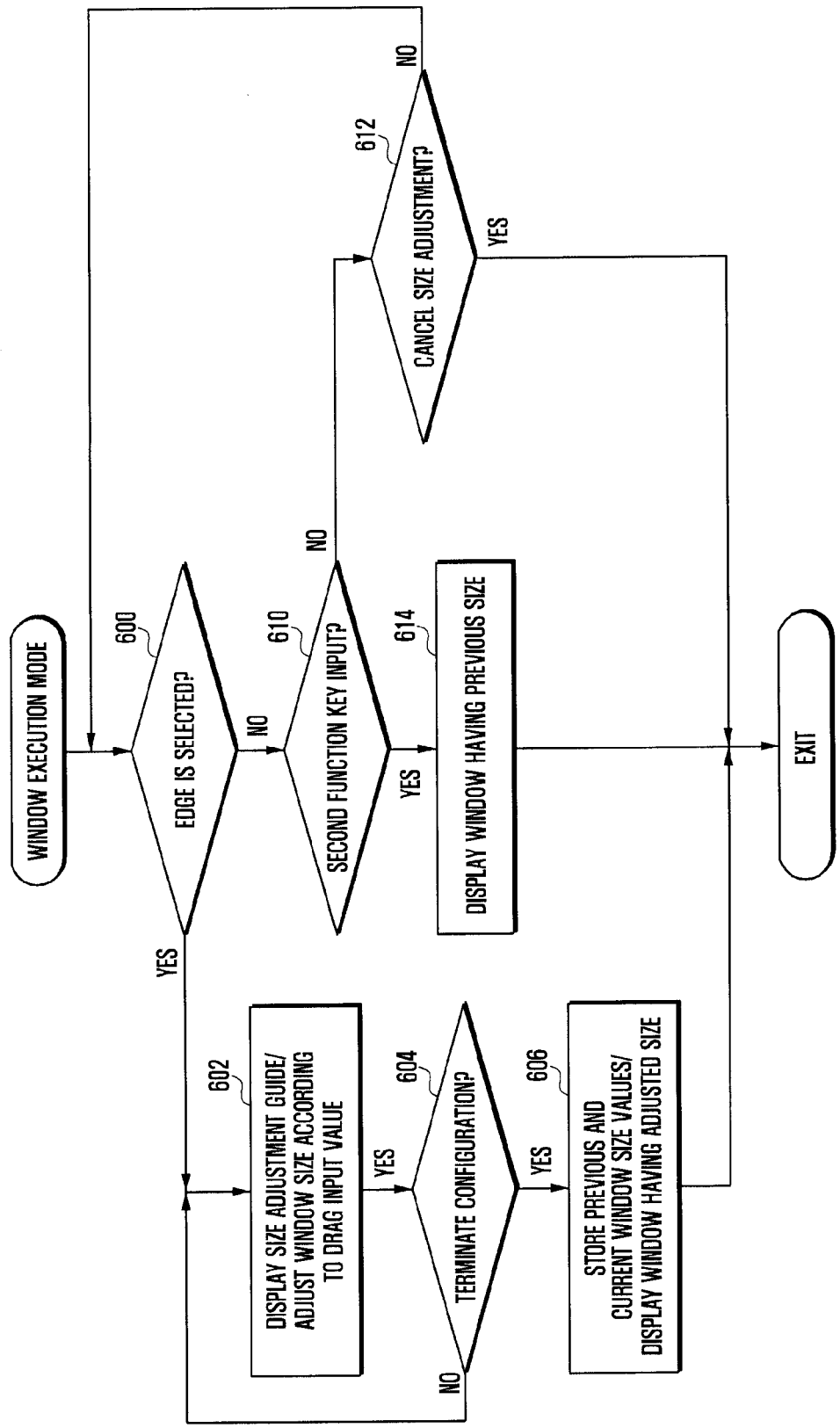
FIG. 6 is a flowchart illustrating a procedure of adjusting the size of a window displayed on an electronic device according to an embodiment of the present disclosure.

FIG. 6 is a flowchart illustrating a procedure of adjusting the size of a window displayed on the electronic device according to an embodiment of the present disclosure.

Hereinafter, the embodiment of FIG. 6 is described with reference to FIGS. 1 to 3. The window size adjustment procedure of FIG. 6 is the detail process of step 514 of FIG. 5.

Referring to FIG. 6, the control unit monitors to detect a signal and, if a signal is detected, i.e., a clicking of a mouse button or a touch input on a touch screen, determines whether the signal is an edge selection signal at step 600. That is, the control unit determines whether one of the left, right, top, and bottom edges or one of the tot left, top right, bottom left, and bottom right corner of the window is selected using a mouse or an electronic pen. If the detected signal is the edge selection signal at step 600, the control unit displays a size adjustment guide on the display 150 and adjusts the window size according to a drag input value on the display 150 at step 602. The edge selection-based window size adjustment operation is described in detail hereinafter.

In the case that the left edge of a window is selected using a mouse pointer or a touch input, the width of the window is extended to the left in correspondence to the drag gesture made to the left and shrink to the right in correspondence to the drag gesture made to the right. Similarly, in the case that the right edge of the window is selected, the width of the window is shrink to the left in correspondence to the left drag gesture and extended to the right in correspondence to the right drag gesture.

In the case that the top or bottom edge of the window is selected using a mouse pointer or a touch input, the length of the window is extended or shrink in a similar manner to the width of the window. The window size adjustment operation with the selection of a corner of the window is described with a representative case where the top left corner of the window is selected hereinbelow.

In the case that the top left corner of the window is selected using a mouse pointer or a touch input, the width and length of the window are extended as much as horizontal and vertical movement distances of the drag gesture to the outward direction and shrink as much as horizontal and vertical movement distance of the drag gesture to the inward direction on the display 150. A detailed description is made thereof with reference to FIG. 8D.

Figure 8D:
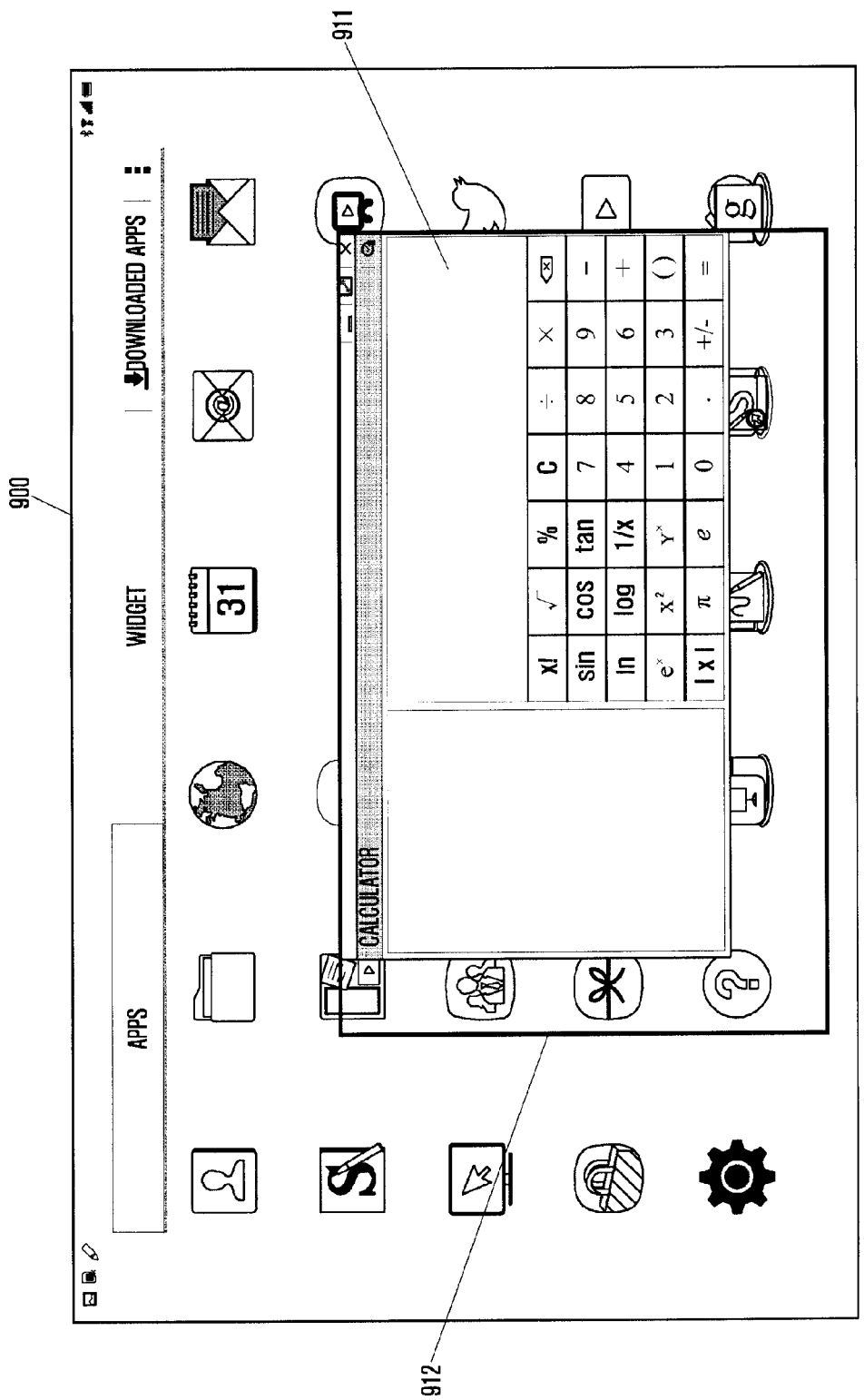
FIG. 8D is a diagram illustrating an exemplary screen display for explaining the application execution window size adjustment procedure according to an embodiment of the present disclosure.

FIG. 8D is a diagram illustrating an exemplary screen display for explaining the application execution window size adjustment procedure according to an embodiment of the present disclosure.

FIG. 8D shows an exemplary case where the bottom left corner of the window 911 is selected using a mouse or an electronic pen, then dragged to the outward direction as denoted by reference number 912. In correspondence to the drag gesture, the calculator application execution window is extended proportionally to the horizontal and vertical movement of the drag amount. The window size is extended as much as the difference in area between the original window and the extended window.

Returning back to FIG. 6, the control unit monitors to detect a signal and, if a signal is detected, determines whether the signal is a configuration termination request signal at step 604 while adjusting the window size. The configuration termination request signal may be generated when the left button 311 of the mouse 310 is clicked down on the edge of the window and then released. The configuration termination request signal may be generated by clicking a separate button or making a certain touch gesture on the touchscreen.

If the detected signal is the configuration termination request signal at step 604, the procedure goes to step 606 and, otherwise, step 602. At step 606, the control unit stores the previous and current window size values in the memory 130. The control unit also controls the display 150 to display the window having the adjusted size at step 606. At this time, the size-adjusted window may be displayed in the form of a preview at step 602. At step 602, the preview window may be rendered in one of two ways:

First, only the frame of the window is enlarged in correspondence to the drag gesture of the mouse 310 without change of the sizes of the icons, files, and text fonts inside the window on the display 150. Second, the sizes of the icons, files, and text fonts are also changing in real time within the window according to the change of the size of the window in correspondence to the drag gesture of the mouse 310.

If the detected signal is not the edge selection signal at step 600, the control unit determines whether the detected signal is a second function key input signal received through the input/output interface 140 at step 610. If the detected signal is the second function key input signal, the procedure goes to step 614 and, otherwise, step 612.

Here, the second click input signal may be a signal request for recovering the previous size of the window. In an embodiment of the present disclosure, the description is directed to the case where a specific key is designated as the second function key for recovering the previous size of the window. Instead of designating a specific key as the second function key, an icon for recovering the previous window size is provided at a side of the window. The previous size may be the default size of the window or, when the window size is changed several times, the window size right before the current size may be the default size. The initial size of the window may be the size preset by the user or the default size configured in the electronic device. Afterward, control unit stores the previous and current window size values in the memory as at step 606 while the user changes the window size. The window size may be adjusted in the course of executing the task requested by the user. Depending on the size and status of the memory 130, the control unit may store only the previous window size value or accumulate the window size values from the start to the end of the change or a predetermined number of window size values, e.g. 4 or 5 window sizes, at step 606.

If the second function input signal inputted by a user is detected at step 610, the control unit reads the previous size value of the corresponding window from the memory 130 to change the window size and display the size-changed window on the display unit 150. Note that the second function input signal can made using a mouse, a touch screen, a stylus pen, or other input device known to artisians.

At step 612, the control unit determines whether the detected signal is a size adjustment cancellation request signal. If the detected signal is the size adjustment cancellation request signal at step 612, the control unit hides the window size adjustment guide and ends the window execution mode.

Figure 9:
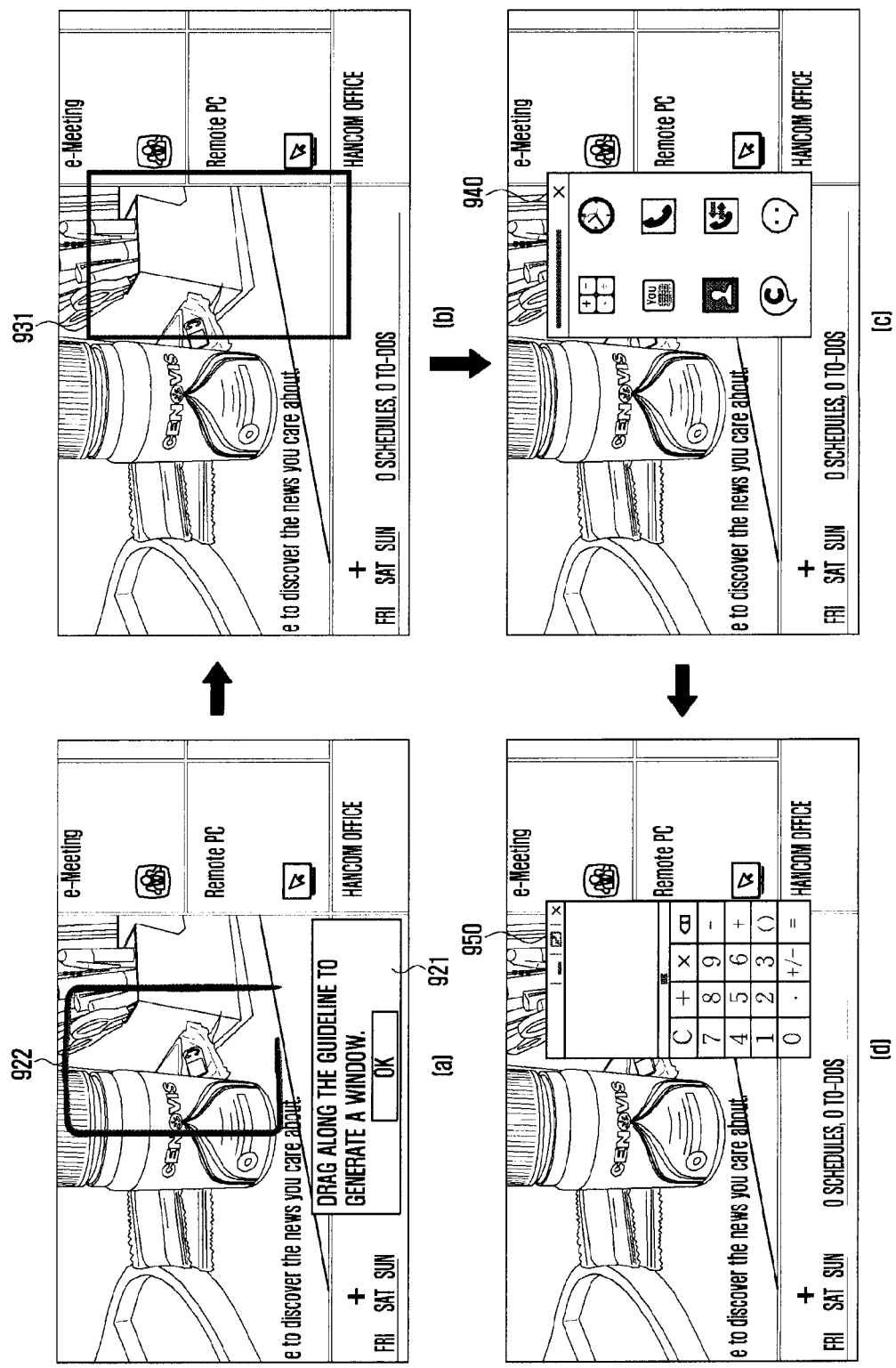
FIG. 9 is a diagram illustrating exemplary screen displays for explaining the whole operation of generating a window in the electronic device according to an embodiment of the present disclosure.

FIG. 9 is a diagram illustrating exemplary screen displays for explaining the whole operation of generating a window in the electronic device according to an embodiment of the present disclosure.

As described with reference to FIG. 3, the electronic device 300 may receive a window generation request signal generated by an external input device, e.g. the mouse 300. In the case of using the mouse 310, this signal may be generated by clicking the left button 311. If the user request for generating a window by means of the mouse 310, the electronic device 300 displays a popup window 921 notifying of the entry to the window generation mode on the display unit 150 as shown in part (a) of FIG. 9. This operation may correspond to step 404 of FIG. 4.

According to various embodiments of the present disclosure, the entry to the window generation mode may be notified to the user with at least one of visual, audio, tactile, and olfactory effects. In part (a) of FIG. 9, the popup window 921 is displayed as an example of notifying the user of the entry to the window generation mode and informing of the window generation method visually. In part (a) of FIG. 9, a drag gesture guideline 922 is displayed along with the popup window 921.

With or without accompaniment of the visual effect, the audio effect may be provided in the form of an alarm sound, a memory, or a guiding announcement through a speaker of the electronic device 300. The audio announcement may say "drag along the guideline to generate a window" which is identical with or similar to the text presented in the popup window 921.

The tactile effect may be generated in the form of a vibration by means of a motor or of a haptic feedback by means of a touch panel or a certain means of and external input device. In the case that the external input device is designed to provide the tactile effect such as vibration and protrusion, the electronic device 300 may send the external input device, e.g. the mouse 310, a signal requesting for generating vibration or protrusion effect.

In the case of using the olfactory effect, it is possible to notify of the entry to the window generation mode by means of a smell generator included in the electronic device 300. In the case that the external device, e.g. the mouse 310, is designed to provide the olfactory effect, the electronic device 300 may send a control signal requesting for generating a certain smell. In the following, the description is made with the case of providing the visual effect. Although part (a) of FIG. 9 is directed to the case where the drag gesture draws a rectangle, the electronic device 300 may provide a guidance to make a horizontal, vertical, or diagonal stroke. Then, the electronic device is detecting an input signal of same point during predetermined time, the electronic device can provide a guidance. The electronic device 300 also may provide a guidance to draw one of various shapes of closed curbs. Examples of the closed curbs include a circle, an oval, a diamond, a parallelogram, a pentagon, and a hexagon. In the following description, the horizontal stroke, vertical stroke, diagonal stroke, closed curbs, and closed polygons are referred to as "object generated by drag gesture."

Although part (a) of FIG. 9 is described in detail above, the whole or part of the operation of part (a) may be omitted. For example, the operation of displaying the popup window 921 and guideline 922 may be omitted selectively, and the supplementary effects such as tactile and olfactory effects may also be omitted selectively.

The effects may be omitted selectively depending on the case. For example, all or at least one of the effect options may be turned off by the user in the settings menu or disabled in the manufacturing stage of the electronic device. Also, the electronic device 300 may be designed such that all or at least one of the effects for notifying the user of the entry to the window generation mode are activated a predetermined number of times, e.g. 10 times, whenever the electronic device powers on from the first use after the purchase of the electronic device and deactivated since then. Also, the electronic device 300 may be configured such that the effects for notifying the user of the entry to the window generation mode are activated basically and deactivated in response to the user's selection of a "do not display" button (not shown in FIG. 9).

Various embodiments of the present disclosure have been described above. In the following, the description is made under the assumption that the operation of part (a) is included for explanation convenience. The description is directed to the case where the drag guideline guides drawing a rectangle (including quadrilateral rectangle) as shown in FIG. 9.

In operation, a user can draw a boundary of box 922 desired to display with a number of application icons, and in response the electronic device generates a box indicated by a reference number 931 what substantially correspond to the drawn box 922. Alternatively, the user may drag a line to define the boundary using a guide 922 as shown in part (a) of FIG. 9 to draw an object in shape of a rectangle (including quadrilateral rectangle) using an external input device as denoted by reference number 931 in part (B) of FIG. 9. Although part (b) of FIG. 9 is directed to the case where the generated object is a rectangle, it is also possible to draw a horizontal stroke, a vertical stroke, a diagonal stroke, a closed curb, a closed polygon, or the like as described above, to define the boundary of the reference number 931. If the user draws the rectangle 931 using the external input device 310 in this way, the electronic device 300 generates a window 940 on the display 150 in correspondence to the drawn rectangle as shown in part (c) of FIG. 9. Here, the electronic device 300 may generate the window 940 having the same size as the drawn rectangle or a predetermined size. Part (c) of FIG. 9 is directed to the case where the window 940 has the same size as the drawn rectangle.

In part (c), the window 940 includes various icons. As aforementioned above, the window 940 may include at least one of icons, files, folders, and widgets. The objects included in the window 940 may include at least one of icons, folders, widgets, and files preset by the user and/or icons preset by the manufacturer of the electronic device 300.

If the user selects an icon (e.g. calculator icon) among the icons arranged in the window 940 in the state of part (c), the corresponding window is replaced with the calculator application program execution window 950 as shown in part (d) of FIG. 9. In the state of displaying the calculator application program execution window 950, the electronic device 300 receives a user input such that the calculator application program performs an operation corresponding to the user input.

The above description has been directed to the operation of generating one window and executing the application by selecting the corresponding icon included in the window. However, it is also possible to generate multiple windows different in shape on the display 150 as described with reference to FIG. 8C.

According to various embodiments of the present disclosure, the devices (e.g. modules or their functions) or methods may be implemented by the execution of computer program instructions stored in a computer-readable storage medium. In the case that the instructions are executed by at least one processor (e.g. processor 210), the at least one processor may execute the functions corresponding to the instructions. The computer-readable storage medium may be the memory 220. At least a part of the programming module may be implemented (e.g. executed) by the processor 210. At least a part of the programming module may include modules, programs, routines, sets of instructions, and processes for executing the at least one function.

As described above, the window display method and apparatus of an electronic device paired with an external input device is advantageous in terms a multiple windows efficiently on the size-constrained screen. Also, the window display method and apparatus of an electronic device paired with an external input device is advantageous in terms of facilitating switch between windows and home screen.

The computer-readable storage medium includes magnetic media such as a floppy disk and a magnetic tape, optical media including a Compact Disc (CD) ROM and a Digital Video Disc (DVD) ROM, a magneto-optical media such as a floptical disk, and the hardware device designed for storing and executing program commands such as ROM, RAM, and flash memory. The programs commands include the language code executable by computers using the interpreter as well as the machine language codes created by a compiler. The aforementioned hardware device can be implemented with one or more software modules for executing the operations of the various exemplary embodiments of the present disclosure.

The module or programming module of the present disclosure may include at least one of the aforementioned components with omission of some components or addition of other components. The operations of the modules, programming modules, or other components may be executed in series, in parallel, recursively, or heuristically. Also, some operations may be executed in different order, omitted, or extended with other operations.

Although various embodiments of the present disclosure have been described using specific terms, the specification and drawings are to be regarded in an illustrative rather than a restrictive sense in order to help understand the present disclosure. It is obvious to those skilled in the art that various modifications and changes can be made thereto without departing from the broader spirit and scope of the disclosure.

What is claimed is:

1. A window display method of an electronic device paired with an external input device, the method comprising: detecting a request signal from the external input device and in response, notifying an entry of a window generation mode; receiving a substantially one-dimensional input gesture on a display screen from the external input device, the substantially one-dimensional input gesture drawing a single edge of a two-dimensional window; determining a length, a width, and a location of the window based on a length and location of the input gesture and a predetermined aspect ratio for a user interface of an application; displaying the window including at least one application or file; executing the application or file within the window, if execution of the application or file in the window is requested; and changing the window to display the executed application or file.

2. The method of claim 1, further comprising:
terminating the window generating mode when the input gesture is not received within a predetermined time duration or in response to a termination request signal from the external input device.

3. The method of claim 1, further comprising adjusting a size of the window according to a size adjustment control signal received from the external input device.

4. The method of claim 3, further comprising storing, when the window size is adjusted, window size values before and after the adjustment.

5. The method of claim 4, further comprising displaying, when a previous size recovery signal is received from the external input device, the window size before the adjustment.

6. The method of claim 1, wherein the input gesture comprises one of a drag motion, a horizontal stroke, and a vertical stroke.

7. The method of claim 6, further comprising displaying, when the input gesture is the drag motion, the window which substantially corresponds to an object generated by the drag motion.

8. The method of claim 1, further comprising displaying, when one of menu items, icons, and files is selected in the user interface, images associated with the selected menu item, icon, or file in the window.

9. An electronic device comprising: a display; an input/output interface through which a user input signal is received from an external input device; at least one processor configured to: notify an entry of a window generation mode in response to a request received from the external input device; receive a substantially one-dimensional input gesture on the display from the external input device, the substantially one-dimensional input gesture drawing a single edge of a two-dimensional window; determining a length, a width, and a location of the window based on a length and location of the input gesture and a predetermined aspect ratio for a user interface of an application; displaying the window including at least one application or file; executing the application or file within the window, if execution of the application or file in the window is requested; and changing the window to display the executed application or file.

10. The electronic device of claim 9, wherein the processor is further configured to terminate the window generation mode when the input gesture is not received within a predetermined time duration or in response to a termination request signal from the external input device.

11. The electronic device of claim 9, wherein the processor is further configured to adjust a size of the window according to a size adjustment control signal received from the external input device through the input/output interface.

12. The electronic device of claim 11, wherein the processor is further configured to store window sizes before and after the adjustment.

13. The electronic device of claim 12, wherein the processor is further configured to display, when a previous size recovery signal is received from the external input device through the input/output interface, the window size before the adjustment.

14. The electronic device of claim 9, wherein the input gesture comprises one of a drag motion, a horizontal stroke, and a vertical stroke.

15. The electronic device of claim 14, wherein the processor is further configured to display, when the input gesture is the drag motion, the window which substantially corresponds to an object generated by the drag motion.

16. The electronic device of claim 9, wherein the processor is further configured to display, when one of menu items, icons, and files in the user interface is selected, images associated with the selected menu item, icon, or file in the window.

* * * * *